US012507974B2

(12) United States Patent
Tian et al.

(10) Patent No.: US 12,507,974 B2
(45) Date of Patent: Dec. 30, 2025

(54) SYSTEMS AND METHODS FOR CORRECTING MOTION ARTIFACTS IN IMAGES

(71) Applicant: SHANGHAI UNITED IMAGING HEALTHCARE CO., LTD., Shanghai (CN)

(72) Inventors: Jiao Tian, Shanghai (CN); Yi Wang, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 596 days.

(21) Appl. No.: 17/823,062

(22) Filed: Aug. 29, 2022

(65) Prior Publication Data

US 2023/0190216 A1 Jun. 22, 2023

Related U.S. Application Data

(63) Continuation of application No. PCT/CN2021/078556, filed on Mar. 1, 2021.

(30) Foreign Application Priority Data

Feb. 28, 2020 (CN) .......................... 202010130973.2
Jun. 1, 2020 (CN) .......................... 202010482915.6

(51) Int. Cl.
*A61B 6/00* (2024.01)
*G06T 7/11* (2017.01)
(Continued)

(52) U.S. Cl.
CPC .............. *A61B 6/5264* (2013.01); *G06T 7/11* (2017.01); *G06T 7/20* (2013.01); *G06V 10/25* (2022.01);
(Continued)

(58) Field of Classification Search
CPC ........... A61B 6/5264; G06T 7/11; G06T 7/20; G06V 10/25
See application file for complete search history.

(56) References Cited

U.S. PATENT DOCUMENTS

2012/0280978 A1 11/2012 Holub et al.
2014/0056497 A1 2/2014 Hsieh et al.
(Continued)

FOREIGN PATENT DOCUMENTS

CN 106056645 A 10/2016
CN 108876730 A 11/2018
(Continued)

OTHER PUBLICATIONS

International Search Report in PCT/CN2021/078556 mailed on May 27, 2021, 4 pages.
(Continued)

*Primary Examiner* — David Bilodeau
(74) *Attorney, Agent, or Firm* — METIS IP LLC

(57) ABSTRACT

Systems and methods for correcting motion artifacts in images are provided. The methods may include obtaining multiple preliminary images of a subject. Each of the multiple preliminary images may correspond to one of multiple phases of at least one motion cycle of the subject. The methods may also include determining an image representation of a target region of the subject in each preliminary image. The methods may also include identifying a target phase of the subject among the multiple phases of the at least one motion cycle based on the image representation of the target region in each preliminary image. The target phase and one or more neighboring phases of the target phase may correspond to a target motion status of the target region. The method may further include generating a sec-
(Continued)

ondary image of the subject corresponding to the target phase based on the target phase of the subject.

20 Claims, 14 Drawing Sheets

(51) Int. Cl.
 *G06T 7/20* (2017.01)
 *G06V 10/25* (2022.01)
(52) U.S. Cl.
 CPC .............. *G06T 2207/10088* (2013.01); *G06T 2207/10104* (2013.01); *G06T 2207/20044* (2013.01); *G06T 2207/20084* (2013.01); *G06T 2207/30172* (2013.01)

(56) References Cited

U.S. PATENT DOCUMENTS

| | | | |
|---|---|---|---|
| 2014/0212011 A1 | 7/2014 | Ye et al. | |
| 2014/0307935 A1 | 10/2014 | Ishii et al. | |
| 2014/0343344 A1* | 11/2014 | Saunders | A61N 5/1049 600/1 |
| 2015/0016586 A1* | 1/2015 | Maurer, Jr. | G06T 7/0014 378/5 |
| 2016/0110893 A1 | 4/2016 | Pang et al. | |
| 2017/0365047 A1 | 12/2017 | Beque et al. | |
| 2018/0260981 A1 | 9/2018 | Gholipour-Baboli et al. | |
| 2019/0012811 A1 | 1/2019 | Wang et al. | |
| 2019/0259185 A1 | 8/2019 | Wang et al. | |
| 2019/0261940 A1 | 8/2019 | Son et al. | |
| 2021/0158492 A1 | 5/2021 | Quan et al. | |

FOREIGN PATENT DOCUMENTS

| | | |
|---|---|---|
| CN | 109345526 A | 2/2019 |
| CN | 109389653 A | 2/2019 |
| CN | 109754448 A | 5/2019 |
| CN | 110378982 A | 10/2019 |
| CN | 110473269 A | 11/2019 |
| CN | 110940943 A | 3/2020 |
| CN | 111369636 A | 7/2020 |
| CN | 111612867 A | 9/2020 |
| JP | 2009028111 A | 2/2009 |
| JP | 2014097409 A | 5/2014 |

OTHER PUBLICATIONS

Written Opinion in PCT/CN2021/078556 mailed on May 27, 2021, 5 pages.

Huang, Min et al., Research and realization of correction method of MRI motion artifact, Chin J Magn Reson Imaging, 4(4): 286-290, 2013.

The Extended European Search Report in European Application No. 21759961.2 mailed on Aug. 11, 2023, 10 pages.

Cheng, Yan et al., Image Quality of Automatic Coronary CT Angiography Reconstruction for Patients with HR≥75 bpm Using an AI-assisted 16-cm z-coverage CT Scanner, BMC Medical Imaging, 2021, 8 pages.

* cited by examiner

SYSTEMS AND METHODS FOR CORRECTING MOTION ARTIFACTS IN IMAGES

CROSS-REFERENCE TO RELATED APPLICATIONS

This application is a continuation of International Patent Application No. PCT/CN2021/078556, filed on Mar. 1, 2021, which claims priority of Chinese Patent Application No. 202010130973.2, filed on Feb. 28, 2020, and Chinese Patent Application No. 202010482915.6, filed on Jun. 1, 2020, the contents of each of which are hereby incorporated by reference.

TECHNICAL FIELD

The present disclosure generally relates to medical image processing, and more particularly, to systems and methods for motion correction for medical images.

BACKGROUND

Medical imaging techniques (e.g., computed tomography (CT), magnetic resonance imaging (MRI), positron emission tomography (PET), single-photon emission computed tomography (SPECT), etc.) are widely used in clinical diagnosis and/or treatment. The quality of images generated in a medical imaging process has a significant influence on disease diagnosis and/or treatment. Motion artifacts often exist in images of coronary arteries of the heart of a patient since the heart beats ceaselessly and a heart rate of the patient may fluctuate due to physiological or unphysiological factors. Thus, there is a need for a system and method for correcting motion artifacts in medical images effectively and accurately.

SUMMARY

In an aspect of the present disclosure, a method implemented on a computing device having a processor and a computer-readable storage device is provided. The method may include obtaining multiple preliminary images of a subject. Each of the multiple preliminary images may correspond to one of multiple phases of at least one motion cycle of the subject. The method may also include determining an image representation of a target region of the subject in each of the multiple preliminary images of the subject. The method may also include identifying a target phase of the subject among the multiple phases of the at least one motion cycle based on the image representation of the target region in each of the multiple preliminary images. The target phase and one or more neighboring phases of the target phase may correspond to a target motion status of the target region. The method may further include generating a secondary image of the subject corresponding to the target phase based on the target phase of the subject.

In some embodiments, the multiple preliminary images may be reconstructed based on original scanning data of the subject. The original scanning data may correspond to the multiple phases. The original scanning data may include original projection data, original magnetic resonance (MR) data or original positron emission tomography (PET) data.

In some embodiments, the determining an image representation of a target region of the subject in each of the multiple preliminary images of the subject may include for each of the multiple preliminary images of the subject, segmenting the target region of the subject in the preliminary image; determining at least one feature element of the target region in the preliminary image; and determining the image representation of the target region in the preliminary image based on the at least one feature element of the target region.

In some embodiments, the at least one feature element of the target region may include a centerline or skeleton of the target region.

In some embodiments, the image representation of the target region may include coordinate information of the at least one feature element of the target region.

In some embodiments, the identifying a target phase of the subject among the multiple phases of the at least one motion cycle based on the image representation of the target region in each of the multiple preliminary images may include obtaining image representations of the target region in preliminary images corresponding to a first plurality of consecutive phases among the multiple phases; determining at least one motion trajectory of the target region based on the image representations of the target region in the preliminary images corresponding to the first plurality of consecutive phases; determining whether the at least one motion trajectory of the target region conforms to the target motion status based on a motion evaluation model; and in response to determining that the at least one motion trajectory of the target region conforms to the target motion status, designating a midpoint phase of the first plurality of consecutive phases as the target phase.

In some embodiments, the motion evaluation model may include a neural network model.

In some embodiments 6, the method may further include in response to determining that one or more of the at least one motion trajectory of the target region does not conform to the target motion status, obtaining image representations of the target region in preliminary images corresponding to a second plurality of consecutive phases among the plurality of phases; and identifying the target phase of the subject based on the image representations of the target region in the preliminary images corresponding to the second plurality of consecutive phases.

In some embodiments, the target motion status may include steady motion of the target region.

In some embodiments, the generating a secondary image of the subject corresponding to the target phase based on the target phase of the subject may include obtaining preliminary images corresponding to the target phase and the one or more neighboring phases of the target phase; and generating the secondary image of the subject corresponding to the target phase based on the preliminary images corresponding to the target phase and the one or more neighboring phases of the target phase.

In some embodiments, the generating the secondary image of the subject corresponding to the target phase based on the preliminary images corresponding to the target phase and the one or more neighboring phases of the target phase may include determining at least one motion vector between the target phase and each of the one or more neighboring phases by performing a multi-scale registration between the preliminary image corresponding to the target phase and each of the preliminary images corresponding to the one or more neighboring phases; and generating the secondary image by correcting the preliminary image corresponding to the target phase according to the at least one motion vector.

In another aspect of the present disclosure, a method implemented on a computing device having a processor and a computer-readable storage device is provided. The method may include obtaining a target image corresponding to a target phase of a subject and obtaining one or more neighboring images each of which corresponds to a neighboring phase of the target phase. The method may also include determining at least one motion vector between the target phase and each of the one or more neighboring phases by performing a multi-scale registration between a target region of the target image and the target region of each of the neighboring images. The method may further include generating a secondary image of the subject by correcting the target image according to the at least one motion vector.

In some embodiments, the method may further include identifying the target phase from multiple phases of at least one motion cycle of the subject.

In some embodiments, identifying the target phase from multiple phases of at least one motion cycle of the subject may include obtaining original scanning data of the subject, the original scanning data corresponding to the multiple phases of the at least one motion cycle of the subject; reconstructing multiple preliminary images of the subject based on the original scanning data; determining an image representation of the target region of the subject in each of the multiple preliminary images of the subject; and identifying the target phase of the subject from the multiple phases of the at least one motion cycle based on the image representation of the target region in each of the multiple preliminary images. Each of the multiple preliminary images may correspond to one of the multiple phases of the subject. The target phase and the one or more neighboring phases of the target phase may correspond to a target motion status of the target region.

In some embodiments, the performing a multi-scale registration between a target region of the target image and the target region of each of the neighboring images may include determining a target feature of the target region in each of the neighboring images; determining a reference feature of the target region in the target image; and performing the multi-scale registration based on the target feature in each of the neighboring images and the reference feature in the target image.

In some embodiments, the performing the multi-scale registration based on the target feature in each of the neighboring images and the reference feature in the target image may include registering the target feature in each of the neighboring images with the reference feature in the target image using a first scale; and registering the registered target feature in each of the neighboring images with the reference feature in the target image using a second scale.

In some embodiments, the second scale may be finer than the first scale.

In some embodiments, the performing a multi-scale registration between a target region of the target image and the target region of each of the neighboring images may include segmenting the target region of the subject in the target image; dividing the target region into two or more sub-regions; obtaining a motion trend of each of the two or more sub-regions; determining a sub-region scale for each of the two or more sub-regions based on the motion trend of each of the two or more sub-regions; and performing the multi-scale registration between each of the neighboring images and the target image based on the sub-region scale for each of the two or more sub-regions.

In some embodiments, the generating a secondary image of the subject by correcting the target image according to the at least one motion vector between the target phase and each of the neighboring phases may include dividing original scanning data of the target image into multiple groups of divided scanning data; reconstructing multiple sub-images each based on one of the multiple groups of divided scanning data; generating corrected sub-images by correcting the multiple sub-images according to the at least one motion vector; and generating the secondary image by fusing the corrected sub-images.

In some embodiments, each of the multiple sub-images may include plurality of intermediate sub-phasic images each corresponding to a time point relating to the target phase. The generating corrected sub-images by correcting the multiple sub-images according to the at least one motion vector may include for each of the plurality of intermediate sub-phasic images of each of the multiple sub-images, obtaining a phase midpoint of the sub-image; obtaining a time point corresponding to the intermediate sub-phasic images; obtaining, from the one or more neighboring phases and based on the midpoint phase and the time point, at least one neighboring phase corresponding to the intermediate sub-phasic images; determining one or more motion vectors for the intermediate sub-phasic images based on the at least one neighboring phase; and generating a corrected intermediate sub-phasic images by correcting the intermediate sub-phasic images according to the one or more motion vectors. The generating corrected sub-images by correcting the multiple sub-images according to the at least one motion vector may also include generating the corrected sub-image by fusing the plurality of corrected intermediate sub-phasic images.

In another aspect of the present disclosure, a system is provided. The system may include at least one storage device including a set of instructions an at least one processor configured to communicate with the at least one storage device. When executing the set of instructions, the at least one processor may be configured to direct the system to perform following operations. The operations may include obtaining multiple preliminary images of a subject; determining an image representation of a target region of the subject in each of the multiple preliminary images of the subject; identifying a target phase of the subject among the multiple phases of the at least one motion cycle based on the image representation of the target region in each of the multiple preliminary images; and generating a secondary image of the subject corresponding to the target phase based on the target phase of the subject. Each of the multiple preliminary images may correspond to one of multiple phases of at least one motion cycle of the subject. The target phase and one or more neighboring phases of the target phase may correspond to a target motion status of the target region In another aspect of the present disclosure, a system is provided. The system may include at least one storage device including a set of instructions and at least one processor configured to communicate with the at least one storage device. When executing the set of instructions, the at least one processor may be configured to direct the system to perform following operations. The operations may include obtaining a target image corresponding to a target phase of a subject; obtaining one or more neighboring images each of which corresponds to a neighboring phase of the target phase; determining at least one motion vector between the target phase and each of the one or more neighboring phases by performing a multi-scale registration between a target region of the target image and the target region of each of the neighboring images; and generating a secondary image of the subject by correcting the target image according to the at least one motion vector.

In another aspect of the present disclosure, a system is provided. The system may include an obtaining module, a target phase identification module, and a correction module. The obtaining module may be configured to obtain multiple preliminary images of a subject. Each of the multiple preliminary images may correspond to one of multiple phases of at least one motion cycle of the subject. The target phase identification module may be configured to determine an image representation of a target region of the subject in each of the multiple preliminary images of the subject; and identify a target phase of the subject among the multiple phases of the at least one motion cycle based on the image representation of the target region in each of the multiple preliminary images, wherein the target phase and one or more neighboring phases of the target phase correspond to a target motion status of the target region. The correction module may be configured to generate a secondary image of the subject corresponding to the target phase based on the target phase of the subject.

In another aspect of the present disclosure, a non-transitory computer readable medium may be provided. The medium may include executable instructions that, when executed by at least one processor, direct the at least one processor to perform a method. The method may include obtaining multiple preliminary images of a subject; determining an image representation of a target region of the subject in each of the multiple preliminary images of the subject; identifying a target phase of the subject among the multiple phases of the at least one motion cycle based on the image representation of the target region in each of the multiple preliminary images; and generating a secondary image of the subject corresponding to the target phase based on the target phase of the subject. Each of the multiple preliminary images may correspond to one of multiple phases of at least one motion cycle of the subject. The target phase and one or more neighboring phases of the target phase may correspond to a target motion status of the target region.

In another aspect of the present disclosure, a system is provided. The system may include an obtaining module and a correction module. The obtaining module may be configured to obtain a target image corresponding to a target phase of a subject; and obtain one or more neighboring images each of which corresponds to a neighboring phase of the target phase. The correction module may be configured to determine at least one motion vector between the target phase and each of the one or more neighboring phases by performing a multi-scale registration between a target region of the target image and the target region of each of the neighboring images; and generate a secondary image of the subject by correcting the target image according to the at least one motion vector.

In another aspect of the present disclosure, a non-transitory computer readable medium may be provided. The medium may include executable instructions that, when executed by at least one processor, direct the at least one processor to perform a method. The method may include obtaining a target image corresponding to a target phase of a subject; obtaining one or more neighboring images each of which corresponds to a neighboring phase of the target phase; determining at least one motion vector between the target phase and each of the one or more neighboring phases by performing a multi-scale registration between a target region of the target image and the target region of each of the neighboring images; and generating a secondary image of the subject by correcting the target image according to the at least one motion vector.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the terms "system," "engine," "unit," "module," and/or "block" used herein are one method to distinguish different components, elements, parts, sections, or assemblies of different levels in ascending order. However, the terms may be displaced by another expression if they achieve the same purpose.

Figure 2:
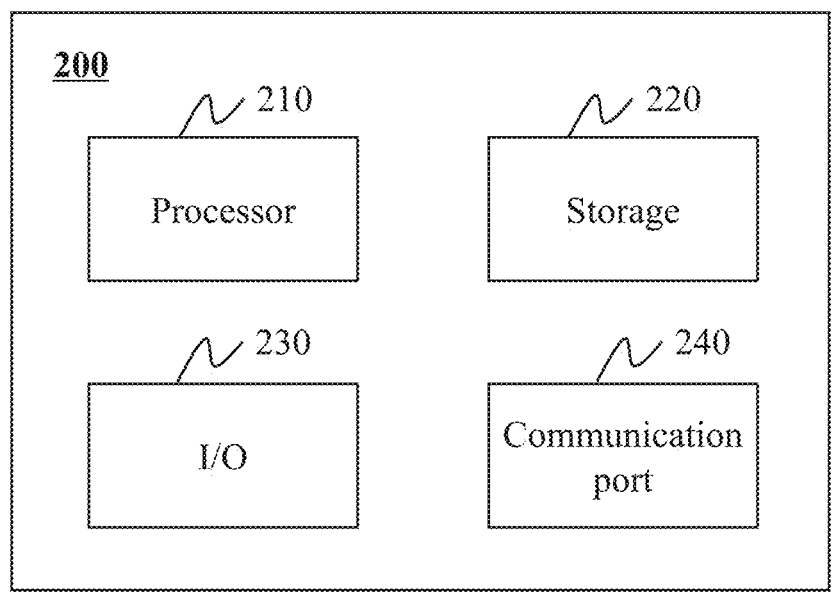
FIG. 2 is a schematic diagram illustrating an exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

Provided herein are systems and methods for non-invasive imaging, such as for disease diagnosis, treatment, and/or research purposes. In some embodiments, the blood vessel parameter determination system may include a single modality system and/or a multi-modality system. The term "modality" used herein broadly refers to an imaging or treatment method or technology that gathers, generates, processes, and/or analyzes imaging information of a subject or treatments the subject. The single modality system may include a computed tomography (CT) system, a computer radiography (CR), a digital radiography (DR), a magnetic resonance imaging (MRI) system, an ultrasound imaging system, an X-ray imaging system, an ultrasonography system, a positron emission tomography (PET) system, an optical coherence tomography (OCT) imaging system, an ultrasound (US) imaging system, an intravascular ultrasound (IVUS) imaging system, a near-infrared spectroscopy (NIRS) imaging system, or the like, or any combination thereof. The multi-modality system may include an X-ray imaging-magnetic resonance imaging (X-ray-MRI) system, a positron emission tomography-X-ray imaging (PET-X-ray) system, a single-photon emission computed tomography-magnetic resonance imaging (SPECT-MRI) system, a positron emission tomography-computed tomography (PET-CT) system, a C-arm system, a positron emission tomography-magnetic resonance imaging (PET-MR) system, a digital subtraction angiography-magnetic resonance imaging (DSA-MRI) system, or the like, or any combination thereof.

In the present disclosure, the term "image" may refer to a two-dimensional (2D) image, a three-dimensional (3D) image, or a four-dimensional (4D) image. In some embodiments, the term "image" may refer to an image of a region (e.g., a region of interest (ROI)) of a subject. As described above, the image may be a CT image, a PET image, an MR image, a fluoroscopy image, an ultrasound image, an Electronic Portal Imaging Device (EPID) image, etc.

As used herein, a representation of a subject (e.g., a patient, or a portion thereof) in an image may be referred to as the subject for brevity. For instance, a representation of an organ or tissue (e.g., the heart, the liver, a lung, etc., of a patient) in an image may be referred to as the organ or tissue for brevity. An image including a representation of a subject may be referred to as an image of the subject or an image including the subject for brevity. As used herein, an operation on a representation of a subject in an image may be referred to as an operation on the subject for brevity. For instance, a segmentation of a portion of an image including a representation of an organ or tissue (e.g., the heart, the liver, a lung, etc., of a patient) from the image may be referred to as a segmentation of the organ or tissue for brevity.

During an imaging scan of coronary arteries of the heart of a patient, the heart beats ceaselessly, and blood may be squeezed out from coronary arteries of the heart due to systole. The blood squeezed out from coronary arteries may have a relatively high pressure and a fast flow rate. As the blood flows through the coronary arteries, the coronary arteries may undergo intense motions. The intense motion may result in motion artifacts in the images of the coronary arteries of the heart. Conventional artifact correction approaches including increasing a rotation speed of a gantry, correcting raw data, performing a motion compensation from a specific angle, etc. However, a heart rate of a patient may fluctuate irregularly due to one or more of physiological factors (e.g., sinus rhythm) or unphysiological factors (e.g., drugs). The conventional artifact correction approaches have a poor effect on artifacts due to the irregular motions.

According to an aspect of the present disclosure, a system and method for correcting motion artifacts in images of may be provided. Multiple preliminary images of the subject may be obtained. Each of the multiple preliminary images may correspond to one of multiple phases of at least one motion cycle of the subject. An image representation of a target region of the subject in each of the multiple preliminary images of the subject may be determined. A target phase of the subject among the multiple phases of the at least one motion cycle may be identified based on the image representation of the target region in each of the multiple preliminary images. The target phase and one or more neighboring phases of the target phase may correspond to a target motion status (e.g., a steady motion status) of the target region. The target region of the subject may undergo a relatively smooth motion over the target phase and the one or more neighboring phases. A preliminary image corresponding to the target phase may be corrected and presented to a user. Since the target phase and one or more neighboring phases of the target phase correspond to the steady motion status, the effect of irregular motions on the preliminary image corresponding to the target phase may be reduced or minimized. Thus, the corrected image corresponding to the target phase (also referred to as secondary image) may have a better quality compared to images corrected using conventional motion correction approaches.

Figure 1:
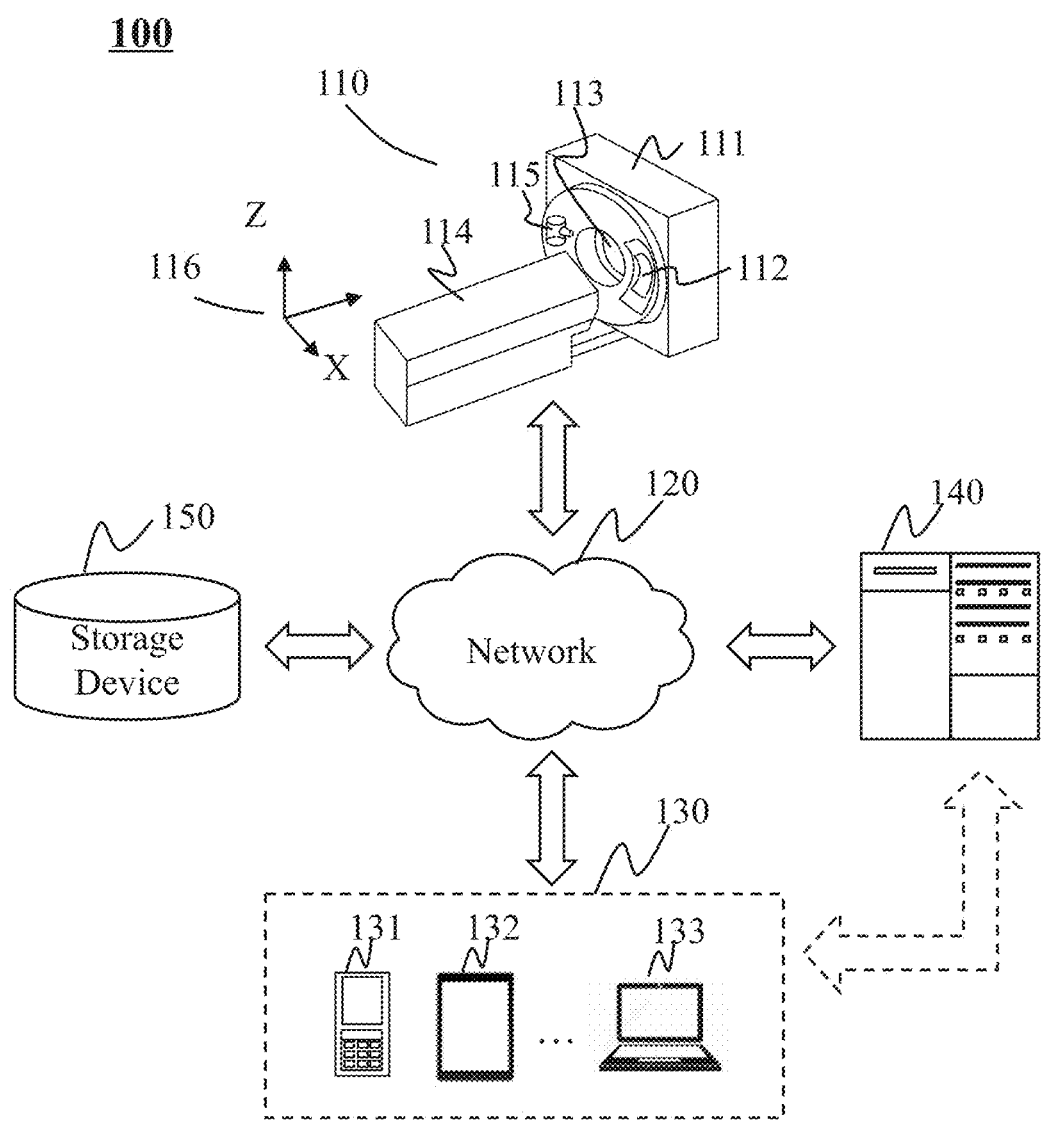
FIG. 1 is a schematic diagram illustrating an exemplary imaging system according to some embodiments of the present disclosure.

FIG. 1 is a schematic diagram illustrating an exemplary imaging system according to some embodiments of the present disclosure. As shown in FIG. 1, the imaging system 100 may include a scanner 110, a network 120, one or more terminals 130, a processing device 140, and a storage device 150. In some embodiments, two or more components of the imaging system 100 may be connected to and/or communicate with each other via a wireless connection, a wired connection, or a combination thereof. The connection among the components of the imaging system 100 may be variable. Merely by way of example, the scanner 110 may be connected to the processing device 140 through the network 120 or directly. As another example, the storage device 150 may be connected to the processing device 140 through the network 120 or directly.

The scanner 110 may be configured to scan a subject or a portion thereof that is located within its detection region and generate scanning data relating to the (portion of) subject. In some embodiments, the scanner 110 may include a single modality device. For example, the scanner 110 may include a CT scanner, a PET scanner, a SPECT scanner, an MR scanner, an ultrasonic scanner, an ECT scanner, or the like, or a combination thereof. In some embodiment, the scanner 110 may be a multi-modality device. For example, the scanner 110 may include a PET-CT scanner, a PET-MR scanner, or the like, or a combination thereof. The following descriptions are provided, unless otherwise stated expressly, with reference to a CT scanner for illustration purposes and not intended to be limiting.

As illustrated, the CT scanner may include a gantry 111, a detector 112, a detecting region 113, a table 114, and a radiation source 115. The gantry 111 may support the detector 112 and the radiation source 115. The gantry 111 may rotate, for example, clockwise or counterclockwise about an axis of rotation of the gantry 111. The radiation source 115 may rotate together with the gantry 111. The subject may be placed on the table 114 for scanning. The radiation source 115 may emit a beam of radiation rays to the subject. The detector 112 may detect the radiation beam (e.g., gamma photons) emitted from the detecting region 113. After the detector 112 receives the radiation beam passing through the subject, the received radiation beam may be converted into visible lights. The visible lights may be converted into electrical signals. The electrical signals may be further converted into digital information using an analog-to-digital (AD) converter. The digital information may be transmitted to a computing device (e.g., the processing device 140) for processing, or transmitted to a storage device (e.g., the storage device 150) for storage. In some embodiments, the detector 112 may include one or more detector units. The detector unit(s) may be and/or include single-row detector elements and/or multi-row detector elements.

For illustration purposes, a coordinate system 116 is provided in FIG. 1. The coordinate system 116 may be a Cartesian system including an X-axis, a Y-axis, and a Z-axis. The X-axis and the Y-axis shown in FIG. 1 may be horizontal and the Z-axis may be vertical. As illustrated, the positive X direction along the X-axis may be from the left side to the right side of the table 114 viewed from the direction facing the front of the scanner 110; the positive Y direction along the Y-axis shown in FIG. 1 may be from the end to the head of the table 114; the positive Z direction along the Z-axis shown in FIG. 1 may be from the lower part to the upper part of the scanner 110.

The processing device 140 may process data and/or information. The data and/or information may be obtained from the scanner 110, the terminal(s) 130, and/or the storage device 150. For example, the processing device 140 may reconstruct an image of a subject based on scanning data obtained from the scanner 110. In some embodiments, the processing device 140 may be a single server or a server group. The server group may be centralized or distributed. In some embodiments, the processing device 140 may be local or remote. For example, the processing device 140 may access information and/or data stored in the scanner 110, the terminal(s) 130, and/or the storage device 150 via the network 120. As another example, the processing device 140 may be directly connected to the scanner 110, the terminal(s) 130, and/or the storage device 150 to access stored information and/or data. In some embodiments, the processing device 140 may be implemented on a cloud platform. For example, a cloud platform may include a private cloud, a public cloud, a hybrid cloud, a community cloud, a distributed cloud, an inter-cloud, and a multi-cloud, or the like, or any combination thereof. In some embodiments, the processing device 140 may be implemented by a computing device 200 having one or more components as illustrated in FIG. 2.

The terminal 130 may input/output signals, data, information, etc. In some embodiments, the terminal 130 may enable a user interaction with the processing device 140. For example, the terminal 130 may display an image of the subject on a screen. As another example, the terminal 130 may obtain a user's input information through an input device (e.g., a keyboard, a touch screen, a brain wave monitoring device), and transmit the input information to the processing device 140 for further processing. The terminal 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footwear, a pair of glasses, a helmet, a watch, clothing, a backpack, a smart accessory, or the like, or any combination thereof. In some embodiments, the mobile device may include a mobile phone, a personal digital assistant (PDA), a navigation device, a point of sale (POS) device, a laptop computer, a tablet computer, a desktop computer, or the like, or any combination thereof. In some embodiments, the virtual reality device and/or augmented reality device may include a virtual reality helmet, a pair of virtual reality glasses, a virtual reality patch, an augmented reality helmet, a pair of augmented reality glasses, an augmented reality patch, or the like, or any combination thereof. For example, the virtual reality device and/or augmented reality device may include a Google Glass™, an Oculus Rift™, a HoloLens™, a Gear VR™, or the like. In some embodiments, the terminal 130 may be part of the processing device 140. In some embodiments, the terminal 130 may be integrated with the processing device 140 as an operation station of the scanner 110. Merely by way of example, a user/operator (for example, a doctor) of the imaging system 100 may control an operation of the scanner 110 through the operation station.

The storage device 150 may store data (e.g., scanning data of a subject), instructions, and/or any other information. In some embodiments, the storage device 150 may store data obtained from the scanner 110, the terminal(s) 130 and/or the processing device 140. For example, the storage device 150 may store scanning data of a subject obtained from the scanner 110. In some embodiments, the storage device 150 may store data and/or instructions executed or used by the processing device 140 to perform exemplary methods described in the present disclosure. In some embodiments, the storage device 150 may include a mass storage, a removable storage, a volatile read-write memory, a read-only memory (ROM), or the like, or any combination thereof. For example, the mass storage may include a magnetic disk, an optical disk, a solid-state drives, a mobile storage, etc. The removable storage may include a flash drive, a floppy disk, an optical disk, a memory card, a ZIP disk, a magnetic tape, etc. The volatile read-and-write memory may include a random access memory (RAM). The RAM may include a dynamic RAM (DRAM), a double date rate synchronous dynamic RAM (DDR-SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), a digital versatile disk ROM, etc. In some embodiments, the storage device 150 may be implemented by the cloud platform described in the present disclosure. For example, a cloud platform may include a private cloud, a public cloud, a hybrid cloud, a community cloud, a distributed cloud, an inter-clouds, a multi-cloud, or the like, or any combination thereof.

In some embodiments, the storage device 150 may be connected to the network 120 to communicate with one or more components (e.g., the processing device 140, the terminal 130, etc.) of the imaging system 100. One or more components of the imaging system 100 may access the data or instructions in the storage device 150 via the network 120. In some embodiments, the storage device 150 may be a part of the processing device 140 or may be independent and directly or indirectly connected to the processing device 140.

The network 120 may include any suitable network that can facilitate the exchange of information and/or data of the imaging system 100. In some embodiments, one or more components of the imaging system 100 (e.g., the scanner 110, the terminal 130, the processing device 140, the storage device 150, etc.) may communicate information and/or data with one or more components of the imaging system 100 via the network 120. The network 120 may include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, server computers, or the like, or a combination thereof. For example, the network 120 may include a wireline network, an optical fiber network, a telecommunication network, a local area network, a wireless local area network (WLAN), a metropolitan area network (MAN), a public telephone switched network (PSTN), a Bluetooth™ network, a ZigBee™ network, a near field communication (NFC) network, or the like, or a combination thereof. In some embodiments, the network 120 may include one or more network access points. For example, the network 120 may include wired and/or wireless network access points, such as base stations and/or Internet exchange points, through which one or more components of the imaging system 100 may be connected to the network 120 to exchange data and/or information.

It should be noted that the above description regarding the imaging system 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the imaging system 100 may include one or more additional components and/or one or more components of the imaging system 100 described above may be omitted. In some embodiments, a component of the imaging system 100 may be implemented on two or more sub-components. Two or more components of the imaging system 100 may be integrated into a single component.

FIG. 2 is a schematic diagram illustrating exemplary hardware and/or software components of an exemplary computing device according to some embodiments of the present disclosure. The computing device 200 may be configured to implement any component of the imaging system 100. For example, the scanner 110, the terminal 130, the processing device 140, and/or the storage device 150 may be implemented on the computing device 200. Although only one such computing device is shown for convenience, the computer functions relating to the imaging system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (e.g., program codes) and perform functions of the processing device 140 in accordance with techniques described herein. The computer instructions may include, for example, routines, programs, objects, components, signals, data structures, procedures, modules, and functions, which perform particular functions described herein. In some embodiments, the processor 210 may perform instructions obtained from the terminal 130 and/or the storage device 150. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the scanner 110, the terminal 130, the storage device 150, or any other component of the imaging system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure.

The I/O 230 may input or output signals, data, and/or information. In some embodiments, the I/O 230 may enable user interaction with the processing device 140. In some embodiments, the I/O 230 may include an input device and an output device.

Exemplary input devices may include a keyboard, a mouse, a touch screen, a microphone, a camera capturing gestures, or the like, or a combination thereof. Exemplary output devices may include a display device, a loudspeaker, a printer, a projector, a 3D hologram, a light, a warning light, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 120) to facilitate data communications. The communication port 240 may establish connections between the processing device 140 and the scanner 110, the terminal 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
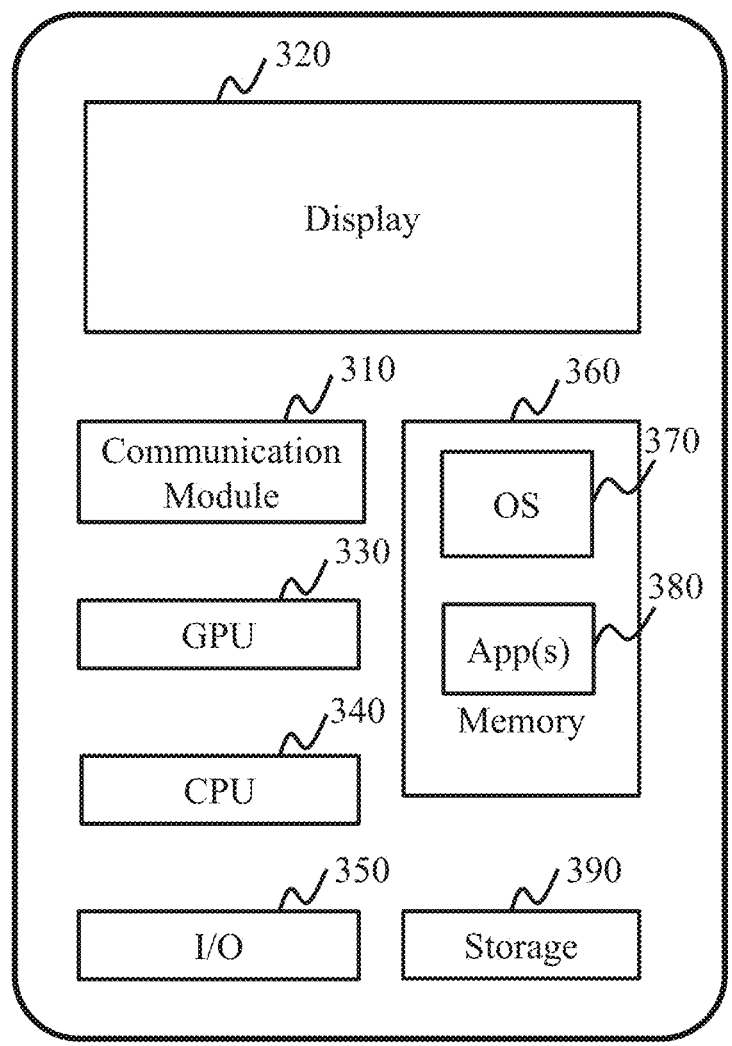
FIG. 3 is a schematic diagram illustrating hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the processing device 140 or the terminal 130 may be implemented on the mobile device 300. As illustrated in FIG. 3, the mobile device 300 may include a communication module 310, a display 320, a graphics processing unit (GPU) 330, a central processing unit (CPU) 340, an I/O 350, a memory 360, and storage 390. The CPU 340 may include interface circuits and processing circuits similar to the processor 210. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to imaging from the blood vessel parameter determination system on the mobile device 300. User interactions with the information stream may be achieved via the I/O devices 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
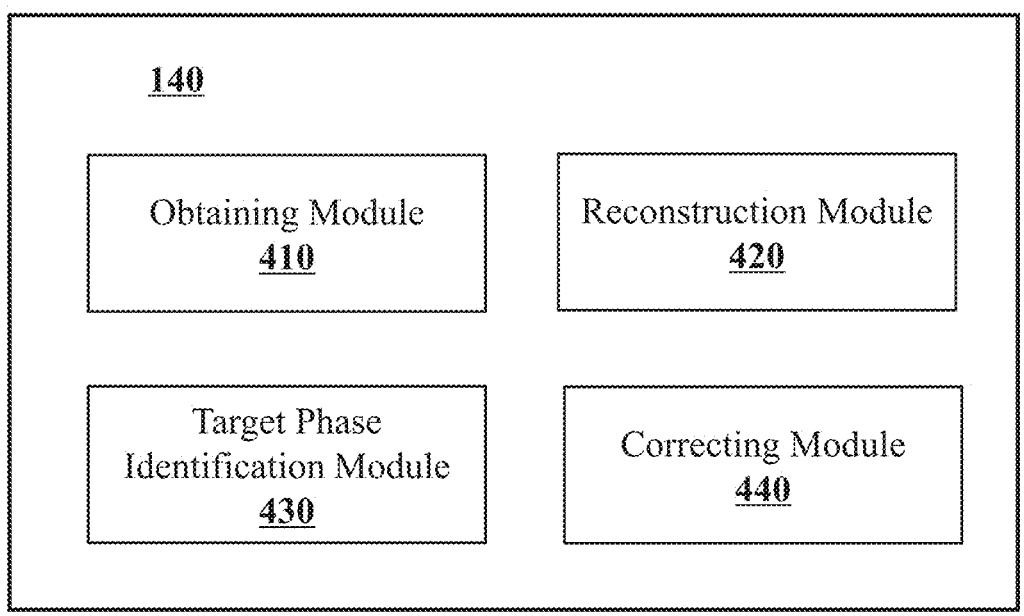
FIG. 4 is a block diagram illustrating an exemplary processing device according to some embodiments of the present disclosure.

FIG. 4 is a block diagram illustrating an exemplary processing device according to some embodiments of the present disclosure. As illustrated in FIG. 4, the processing device 140 may include an obtaining module 410, a reconstruction module 420, a target phase identification module 430, and a correction module 440.

The obtaining module 410 may be configured to obtain information and/or data relating to motion correction (e.g., from one or more components of the imaging system 100). For example, the obtaining module 410 may obtain original scanning data of a subject. The original scanning data may correspond to multiple phases of at least one motion cycle of the subject. The original scanning data may also be referred to as raw data. As another example, the obtaining module 410 may obtain multiple preliminary images of the subject. As still another example, the obtaining module may obtain a target image corresponding to a target phase of the subject and/or one or more neighboring phases. For instance, the obtaining module 410 may obtain a target phase from a gating device operably connected to the subject, a user instruction, a storage device, etc. More descriptions regarding the obtaining information and/or data may be found elsewhere in the present disclosure (e.g., FIGS. 5A, 5B, 10 and the relevant descriptions). The reconstruction module may be configured to reconstruct one or more images according to an image reconstruction algorithm. For example, the reconstruction module 420 may reconstruct the multiple preliminary images of the subject based on the original scanning data. Each of the multiple preliminary images may correspond to one of the multiple phases of the subject. As another example, the reconstruction module 420 may reconstruct a target image based on target scanning data corresponding to the target phase. As still another example, the reconstruction module 420 may reconstruct a neighboring image based on neighboring scanning data corresponding to a neighboring phase of the target phase. More descriptions regarding the image reconstruction may be found elsewhere in the present disclosure (e.g., operation 520 in FIG. 5 and the relevant description).

The target phase identification module 430 may be configured to identify the target phase of the subject among the multiple phases of the at least one motion cycle. For example, the target phase identification module 430 may determine an image representation of a target region of the subject in each of the multiple preliminary images of the subject. The target phase identification module 430 may identify a target phase of the subject among the multiple phases of the at least one motion cycle based on the image representation of the target region in each of the multiple preliminary images. More descriptions regarding the identification of the target phase may be found in elsewhere in the present disclosure (e.g., operations 530 and 540 in FIG. 5, FIGS. 6 and 7 and the relevant descriptions thereof).

The correction module 440 may be configured to generate a secondary image of the subject corresponding to the target phase based on the target phase of the subject. For example, the correction module 440 may determine at least one motion vector between the target phase and each of the one or more neighboring phases by performing a multi-scale registration between a target region of the target image and the target region of each of the one or more neighboring images. The correction module 440 may generate the secondary image by correcting the target image corresponding to according to the at least one motion vector. More descriptions regarding correcting the target image may be found in elsewhere in the present disclosure (e.g., FIGS. 5 and 10 and the relevant descriptions).

The modules in the processing device 140 may be connected to or communicated with each other via a wired connection or a wireless connection. The wired connection may include a metal cable, an optical cable, a hybrid cable, or the like, or any combination thereof.

The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the above-mentioned modules may be integrated into a console (not shown). Via the console, a user may set parameters for scanning a subject, controlling imaging processes, controlling parameters for correcting and/or reconstruction of an image, viewing images, etc. As another example, the processing device 140 may include a storage module (not shown) configured to store information and/or data (e.g., scanning data, images) associated with the above-mentioned modules.

Figure 5A:
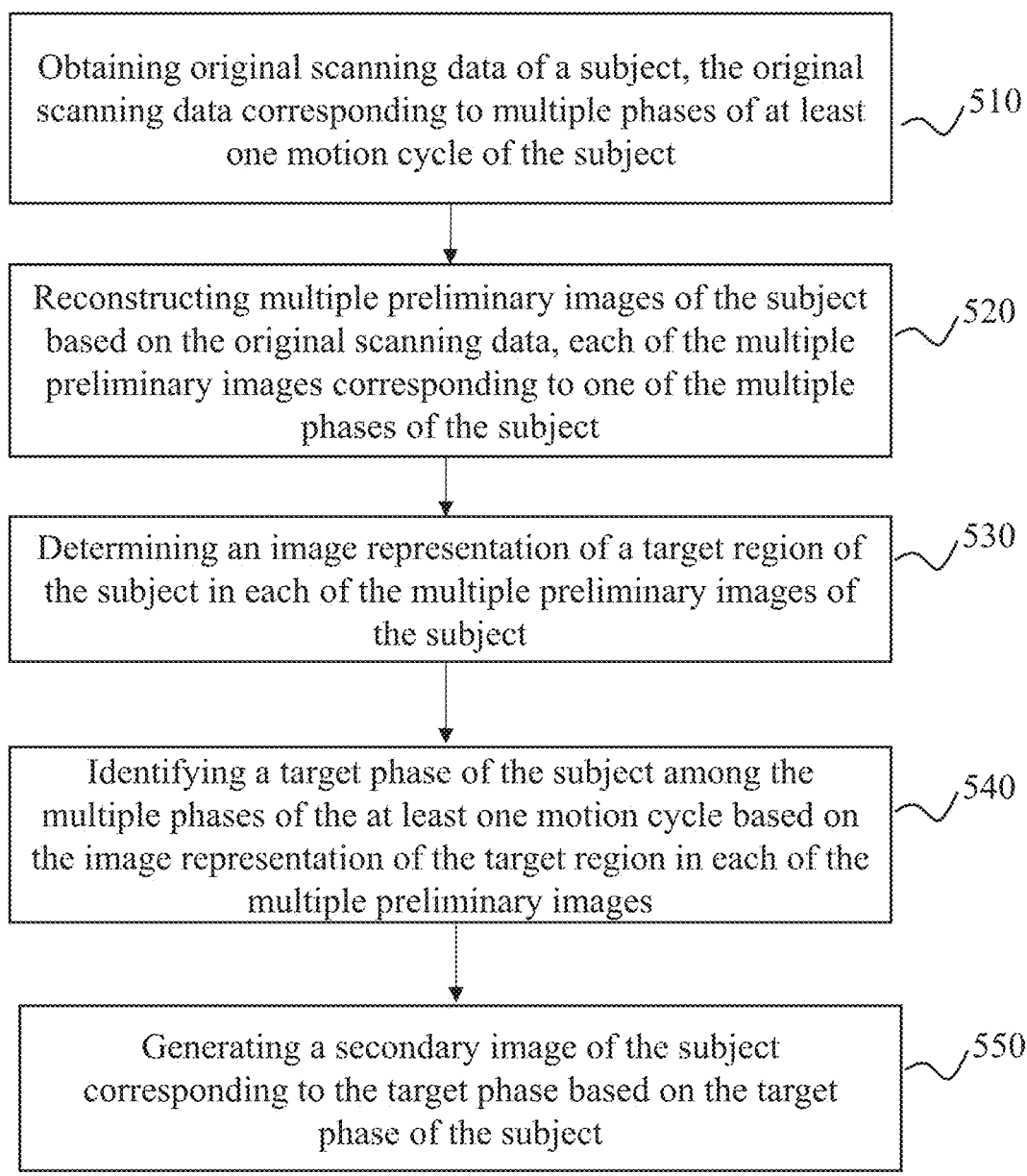
FIG. 5A is a flowchart illustrating an exemplary process for generating one or more images of the subject according to some embodiments of the present disclosure.

FIG. 5A is a flowchart illustrating an exemplary process for generating one or more images of the subject according to some embodiments of the present disclosure. In some embodiments, the process 500 may be executed by the imaging system 100. For example, the process 500 may be implemented as a set of instructions (e.g., an application) stored in a storage device (e.g., the storage device 150). The modules described in FIG. 4 and/or the processor 210 may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5A and described below is not intended to be limiting.

In 510, the processing device 140 (e.g., the obtaining module 410 or the processor 210) may obtain original scanning data of a subject. The original scanning data may correspond to multiple phases of at least one motion cycle of the subject.

The subject may include a biological subject and/or a non-biological subject. The biological subject may be a human being, an animal, or a specific portion thereof including, e.g., an organ, and/or tissue thereof. For example, the subject may include the heart, a lung, etc., of a human being or an animal, or a portion thereof. In some embodiments, the subject may be a man-made composition of organic and/or inorganic matters that are with or without life. For example, the subject may include a phantom of the heart, a lung, of a human being or an animal, or a portion thereof. Unless otherwise stated, the following descriptions are provided by way of example with reference to imaging of a subject including the heart of a patient, and a correction of an image of the subject with respect to motion artifact. It is understood that this is for illustration purposes and not intended to be limiting. The system and method disclosed herein may be applied to imaging of other types of subjects and a correction of an image of such a subject with respect to motion artifact. For instance, the subject may include a lung of a patient undergoing a reciprocating motion.

As used herein, the original scanning data refers to scanning data generated by an imaging device (e.g., the scanner 110) in a scan performed on the subject. The original scanning data may also be referred to as raw data. In some embodiments, the scan may be performed according to a scanning protocol. The scanning protocol may include parameters of the scanner 110, a scanning mode of the scanner 110, a size of a region to be scanned, position information of the region, etc. For instance, a CT scan is performed, the original scanning data may be original projection data generated by a CT scanner. Merely by way of example, during a CT scan performed on a subject (e.g., the heart of a patient), the radiation source 115 may emit a beam of radiation rays at one or more specific time points or time periods, the detector 112 may detect radiation rays passing through the subject and impinging thereon. Original projection data of the subject may be generated based on the detected rays passing through the subject and impinging on the detector 112. The original projection data may be determined as the original scanning data.

Each of the one or more specific time points may also be referred to as a data acquisition time point. Each of the one or more specific time periods may also be referred to as a data acquisition time period. Since the radiation source 115 is moving (e.g., rotating about an axis of the gantry 111), each data acquisition time point may correspond to a data acquisition angle. The data acquisition angle at a data acquisition time point may be a rotation angle of the radiation source 115 or the gantry 111, at the data acquisition time point, relative to a coordinate system (e.g., the coordinate system 116 as illustrated in FIG. 1). A data acquisition angle may be, for example, 5°, 10°, 15°, 30°, 60°, 90°, 150°, 180°, etc. A scanning angle range may be a range of rotation angles (e.g., 0-240°) of the radiation source 115 or the gantry 111 during the scan. A data acquisition angle range may correspond to a set of original projection data that is acquired within the data acquisition angle range. The original scanning data may include a plurality of sets of original projection data each of which corresponds to one of a plurality of data acquisition angle ranges in a scan.

In some embodiments, the subject, or a portion thereof, may undergo a reciprocating motion. The reciprocating motion may include a plurality of motion cycles. Each of the plurality of motion cycles may include multiple phases. A phase in a motion cycle may correspond to a transient state of the subject in the motion cycle. The subject including the heart of the patient as exemplified, may undergo a reciprocating motion. A cardiac cycle may constitute a motion cycle of the reciprocating motion. The cardiac cycle may start from an initial state of the heart of the patient, and back to the initial state when the cardiac cycle ends. The cardiac cycle may include a plurality of transient states of the heart of the patient. As used herein, a transient state of a subject undergoing a motion (e.g., the heart of a patient undergoing a cardiac motion or a cardiac cycle) refers to a state of the subject at a time point during the motion. Each of the plurality of transient states may correspond to a specific time point in the cardiac cycle. The time point may correspond to a phase of the cardiac cycle. Assuming that the cardiac cycle lasts a time period of T, a phase at 0.4T refers to a state of the heart of the patient at which the cardiac cycle reaches 40%. A phase may correspond to a specific transient state of the heart in the cardiac cycle.

In some embodiments, the original scanning data may correspond to multiple phases of at least one motion cycle of the subject. For instance, for a phase at 0.4T, a data acquisition time point corresponding to the phase may be determined. A data acquisition angle corresponding to the data acquisition time point may be obtained. A data acquisition angle range having a midpoint data acquisition angle may be determined, in which the midpoint data acquisition angle corresponds to the data acquisition time point. Accordingly, the data angle range may correspond to a plurality of data acquisition time points centered by the data acquisition time point. As used herein, the midpoint data acquisition angle of a data acquisition angle range refers to a data acquisition angle whose value is the middle of, or closet to the middle of, the data acquisition angle range. For instance, if the data acquisition angle range is 0-270° and includes data acquisition angles in 1° increments, the midpoint data acquisition angle is 135°. As another example, if the data acquisition angle range is 20-240° and includes data acquisition angles in 2° increments, the midpoint data acquisition angle is 130°. A data acquisition angle may correspond to a piece of original scanning data. A data acquisition angle range may correspond to a set of original scanning data including a plurality of pieces of the original data. The original scanning data may include multiple sets of original scanning data each of which corresponds to one data acquisition angle range, and therefore corresponds to one of the multiple phases of the at least one motion cycle of the subject. That is, one of the multiple phases may correspond to one data acquisition angle range and a set of original scanning data. As a data acquisition angle range corresponds to a plurality of data acquisition time points, a phase corresponding to the data acquisition angle range may also be referred to as a phase relating to the plurality of data acquisition time points. For brevity, the phase may also be referred to as a phase relating to a plurality of time points.

In some embodiments, the multiple phases may be consecutive phases in the at least one motion cycle of the subject. For instance, a motion cycle includes seven phases. The seven phases may be numbered as a first phase, a second phase, a third phase, a fourth phase, a fifth phase, a sixth phase and a seventh phase in a sequence according to data acquisition time points corresponding to the seven phases. The multiple phases corresponding to the obtained original scanning data may include a specific count (e.g., 2, 3, 4, 5, 6, or 7) of consecutive phases among the 7 phases. For example, the multiple phases may include 3 phases including the first phase, the second phase, and the third phase. The multiple consecutive phases may correspond to multiple consecutive transient states of the subject.

In some embodiments, the original scanning data may be obtained from a detector (e.g., the detector 112 of the scanner 110 as shown in FIG. 1). In some embodiments, the original scanning data may be obtained from a storage device (e.g., the storage device 150).

In 520, the processing device 140 (e.g., the reconstruction module 420 or the processor 210) may reconstruct multiple preliminary images of the subject based on the original scanning data, each of the multiple preliminary images corresponding to one of the multiple phases of the subject.

In some embodiments, each of the multiple preliminary images of the subject may be reconstructed based on a set of original scanning data corresponding to one of the multiple phases of the subject. The preliminary image may be reconstructed according to an image reconstruction algorithm. Exemplary image reconstruction algorithms may include an iterative reconstruction algorithm, a back projection (FBP) algorithm, a Fourier slice theorem algorithm, a fan-beam reconstruction algorithm, an analytic reconstruction algorithm (a Fourier transform algorithm, a filtered back projection (FBP) algorithm, etc.), or the like, or any combination thereof. Exemplary iterative reconstruction algorithms may include but not limited to a synchronous algebraic reconstruction technology (SART), a synchronous iterative reconstruction technology (SIRT), an ordered subset convex technology (OSC), an ordered subset maximum likelihood method, an ordered subset expectation maximization (OSEM) method, an adaptive statistical iterative reconstruction technology (ASIR) method, a least squares QR method, an expectation maximization (EM) method, an ordered subset-separable parabolic replacement technology (OS-SPS), an algebraic reconstruction technology (ART), a Kacsmarz reconstruction technology, etc.

In some embodiments, the multiple preliminary images may be CT images. In some embodiments, each of the CT images may be a three-dimensional (3D) image or 3D image data. In some embodiments, a CT image may include a set or stack of two-dimensional (2D) images or 2D image data.

In some embodiments, a preliminary image of the subject corresponding to a specific phase may be an image of a specific transient state of the subject, or a portion thereof, in a motion cycle. Referring to the above example, the cardiac cycle lasts a time period of T, and the phase at 0.4T may correspond to a transient state of the heart at which the motion cycle reaches 40% of a cardiac cycle in terms of time. A preliminary image corresponding to the phase at 0.4T may be reconstructed based on a set of original scanning data corresponding to the phase at 0.4T. The preliminary image corresponding to the phase 0.4T refers to an image corresponding to the transient state of the heart at which the cardiac cycle reaches 40% of a cardiac cycle in terms of time.

In 530, the processing device 140 (e.g., the target phase identification module 430 or the processor 210) may determine an image representation of a target region of the subject in each of the multiple preliminary images of the subject.

The target region may be a part of the subject. In some embodiments, the target region may be a region of the subject that has one or more distinct characteristics (e.g., undergoing an intense motion) relative to other regions of the subject that are represented in an image. For example, the subject may be the heart of a patient, and the target region may include coronary arteries of the heart. The heart of the patient beats ceaselessly. During this process, blood may be squeezed out from coronary arteries of the heart due to systole. The blood squeezed out from coronary arteries may have a relatively high pressure and a fast flow rate. As the blood flows through the coronary arteries, the coronary arteries may undergo an intense motion. In other words, the coronary arteries may undergo an intense motion during the cardiac cycle. The intense motion may cause motion artifacts in the preliminary images of the heart.

As used herein, the image representation of the target region refers to a representation of the target region of the subject in the form of at least one feature element of the target region in an image (e.g., a preliminary image) and relevant information of the target region and/or of the at least one feature element. A feature element of the target region refers to an element of the target region representing of the target region in the preliminary image. In some embodiments, the at least one feature element of the target region may include at least one feature point of the target region, at least one feature of the target region, at least one feature region of the target region, etc. Merely by way of example, the at least one feature of the target region may include a centerline of the target region. For instance, for coronary arteries of the heart of a patient, at least one centerline of the coronary arteries may be determined as the feature element of the target region.

In some embodiments, relevant information of a feature element may include coordinate information (e.g., coordinates) regarding the feature element in the multiple preliminary images of the subject. The coordinate information may be determined with respect to a preset coordinate system. Merely for illustration purposes, the preset coordinate system may include an image coordinate system. An origin of the image coordinate system may be, for example, a pixel at an upper left corner of a preliminary image (e.g., a pixel in a first row and a first column among pixels of the preliminary image). Two axes of the image coordinate system may be along a row direction and a column direction of the pixels of the preliminary image, respectively. Coordinates of the pixels of the feature element in a preliminary image in the image coordinate system may indicate a position of the feature element in the preliminary image.

In some embodiments, for each of the multiple preliminary images of the subject, the processing device 140 may segment the target region of the subject in the preliminary image and determine at least one feature element of the target region in the preliminary image. The image representation of the target region in the preliminary image may be determined based on the at least one feature element of the target region. Details regarding the determination of the image representation of the target region of the subject can be found elsewhere in the present disclosure. See, for example, FIG. 7 and the descriptions thereof.

In 540, the processing device 140 (e.g., the target phase identification module 430 or the processor 210) may identify a target phase of the subject among the multiple phases of the at least one motion cycle based on the image representation of the target region in each of the multiple preliminary images.

The target phase refers to a midpoint phase of a specific count of consecutive phases among the multiple phases. In some embodiments, the specific count may be an odd number. The target region of the subject may undergo a relatively smooth motion (e.g., a motion such as irregular and/or abrupt changes) over the specific count of consecutive phases. In some embodiments, the motion status of the target region may be different for different subjects or a same subject in different time periods. For instance, a motion status of the heart of a patient may vary in a same cardiac cycle or different cardiac cycles. In this case, the processing device 140 may identify the target phase. The specific count of consecutive phases other than the target phase (also referred to as one or more neighboring phases of the target phase) and the target phase may correspond to the steady motion status.

In some embodiments, to determine whether the target region undergoes a relatively smooth motion over the specific count of consecutive phases, the processing device 140 may determine whether a position variation of the target region is uniform or linear over the specific count of consecutive phases. In some embodiments, the position variation of the target region may be represented by a variation of coordinate information (e.g., coordinates) of at least one feature element of the target region.

In some embodiments, coordinates of at least one feature element of the target region corresponding to a first plurality of consecutive phases may be determined. The processing device 140 may determine whether a position variation of the target region is uniform or linear by fitting the coordinates of the at least one feature element of the target region corresponding to the first plurality of consecutive phases to a straight line, a curve (e.g., a portion of a curve of a quadratic function, a portion of a curve of a power function), etc. Merely for illustration, if the coordinates of the at least one feature element of the target region corresponding to the first plurality of consecutive phases to a straight line having a specific slope, a midpoint phase of the first plurality of consecutive phases may be designated as the target phase. Otherwise, the processing device 140 may obtain image representations of the target region in preliminary images corresponding to a second plurality of consecutive phases among the multiple phases, and identify the target phase of the subject based on the image representations of the target region in the preliminary images corresponding to the second plurality of consecutive phases.

It is understood that the methods or embodiments provided above are merely for illustration purposes and not intended to be limiting. Multiple variations or modifications may be made under the teachings of the present disclosure. In some embodiments, after the coordinates of the at least one feature element of the target region corresponding to the first plurality of consecutive phases are determined, the processing device 140 may determine whether the position variation of the target region is uniform or linear by determining a gradient of changes in the coordinates of the at least one feature element of the target region between each pair of consecutive phases among the first plurality of phases. If gradients of changes in the coordinates among different pairs of consecutive phases among the first plurality of phases are (substantially) the same, indicating that the position variation of the target region is linear, a midpoint phase of the first plurality of consecutive phases may be designated as the target phase. Otherwise, the processing device 140 may obtain image representations of the target region in preliminary images corresponding to a second plurality of consecutive phases among the multiple phases, and identify the target phase of the subject based on the image representations of the target region in the preliminary images corresponding to the second plurality of consecutive phases.

In some embodiments, to determine whether the target region undergoes a relatively smooth motion over a first plurality of consecutive phases, the processing device 140 may also determine whether at least one motion trajectory of the target region conforms to a target motion status. The at least one motion trajectory of the target region may be determined based on the image representation of the target region in preliminary images corresponding to the first plurality of consecutive phases. In some embodiments, each of the at least one motion trajectory may be represented by a smooth curve, a function, etc. The target motion status may include a steady motion status. The steady motion status refers to a motion status in which a motion velocity of the target region of the subject over the first plurality of consecutive phases may substantially be a constant. As used herein, the value of a parameter (e.g., motion velocity) being "substantially" constant indicates that the deviation of the value of the parameter from a constant value is below a threshold, e.g., 10%, 8%, 5%, etc., of a reference value of the parameter; a reference value of the parameter may be, e.g., an average value, a mean value, a target value, etc., of the parameter.

In some embodiments, the processing device 140 may determine whether a motion trajectory of the target region conforms to a target motion status by comparing a curve, a function, etc., of the motion trajectory of the target region with a preset curve (e.g., a straight line), a preset function (e.g., a linear function), etc., corresponding to the target motion status, respectively.

In some embodiments, a motion evaluation model may be obtained. The motion evaluation model may be provided to determine whether the at least one motion trajectory of the target region conforms to the target motion status. In some embodiments, the motion evaluation model may be a model including various curves, functions, algorithms, logic operations, program codes, routines, procedures, etc. For example, the motion evaluation model may include a preset curve (e.g., a straight line), a preset function (e.g., a linear function), etc. The preset curve and/or the preset function may be set by a user, according to default settings of the imaging system 100, etc. In some other embodiments, the motion evaluation model may be a machine learning model (e.g., a neural network model, a deep learning model, etc.) determined based on prior images of the subject and/or other subjects including a same type of target region (e.g., a same organ or portion of each of different patients) undergoing a relatively smooth motion. The processing device 140 may determine whether at least one motion trajectory of the target region corresponding to the first plurality of consecutive phases conforms to the target motion status by inputting the at least one motion trajectory of the target region corresponding to the first plurality of consecutive phases into the motion evaluation model.

If the at least one motion trajectory of the target region corresponding to the first plurality of consecutive phases conforms to the target motion status, a midpoint phase of the first plurality of consecutive phases may be designated as the target phase. If any one of the at least one motion trajectory of the target region corresponding to the first plurality of consecutive phases does not conform to the target motion status, the processing device 140 may obtain image representations of the target region in preliminary images corresponding to a second plurality of consecutive phases among the multiple phases, and identify the target phase of the subject based on the image representations of the target region in the preliminary images corresponding to the second plurality of consecutive phases. Details regarding the determination of the target phase can be found elsewhere in the present disclosure. See, for example, FIG. 6 and the descriptions thereof.

In 550, the processing device 140 (e.g., the correcting module 440 or the processor 210) may generate a secondary image of the subject corresponding to the target phase based on the target phase of the subject.

Since the target phase and one or more neighboring phases of the target phase correspond to the steady motion status, the effect of irregular motions on the preliminary image corresponding to the target phase may be reduced or minimized. A neighboring phase used herein refers to a phase immediately next to (e.g., immediately subsequent to, immediately prior to) the target phase, or a phase that belongs to a group of consecutive phases including the target phase. A phase immediately prior to the target phase may occur before the target phase occurs. A phase immediately subsequent to the target phase may occur after the target phase occurs. Thus, the secondary image of the subject corresponding to the target phase (also referred to as motion corrected image) may have a better quality, compared to an image reconstructed based on original scanning data of other phases corresponding to non-steady motion status.

In some embodiments, the processing device 140 may obtain a target image and at least a part of preliminary images corresponding to the one or more neighboring phases of the target phase (also referred to as neighboring images). The secondary image of the subject corresponding to the target phase may be generated based on the target image and the neighboring images. In some embodiments, the secondary image of the subject corresponding to the target phase may be generated by correcting the target image based on the target image and at least a part of the neighboring images. For example, the correction of the target image may include predicting and/or compensating the target image based on the target image and the neighboring images. In some embodiments, the correction may be performed in image domain or in data domain.

In some embodiments, the processing device 140 may determine at least one motion vector between the target phase and a neighboring phase based on the target image and each of the neighboring images by performing a multi-scale registration on the target image and each of the neighboring images. The secondary image may be generated by correcting the target image according to the at least one motion vector. Details regarding the generation of the secondary image corresponding to the target phase can be found elsewhere in the present disclosure. See, for example, FIG. 10 and the descriptions thereof.

It should be noted that the above description is merely provided for the purposes of illustration, and not intended to limit the scope of the present disclosure. For persons having ordinary skills in the art, multiple variations or modifications may be made under the teachings of the present disclosure. For example, in cases that the scanner 110 is an MR scanner, a PET scanner, a CR scanner, a DR scanner, an ultrasound scanner, etc., the original scanning data may be original MR data, original PET data, original CR data, original DR data, original ultrasound data, etc. correspondingly. As another example, the linear fitting approach and/or the calculation of the gradient of coordinates may be embedded in a model. However, those variations and modifications do not depart from the scope of the present disclosure.

Figure 5B:
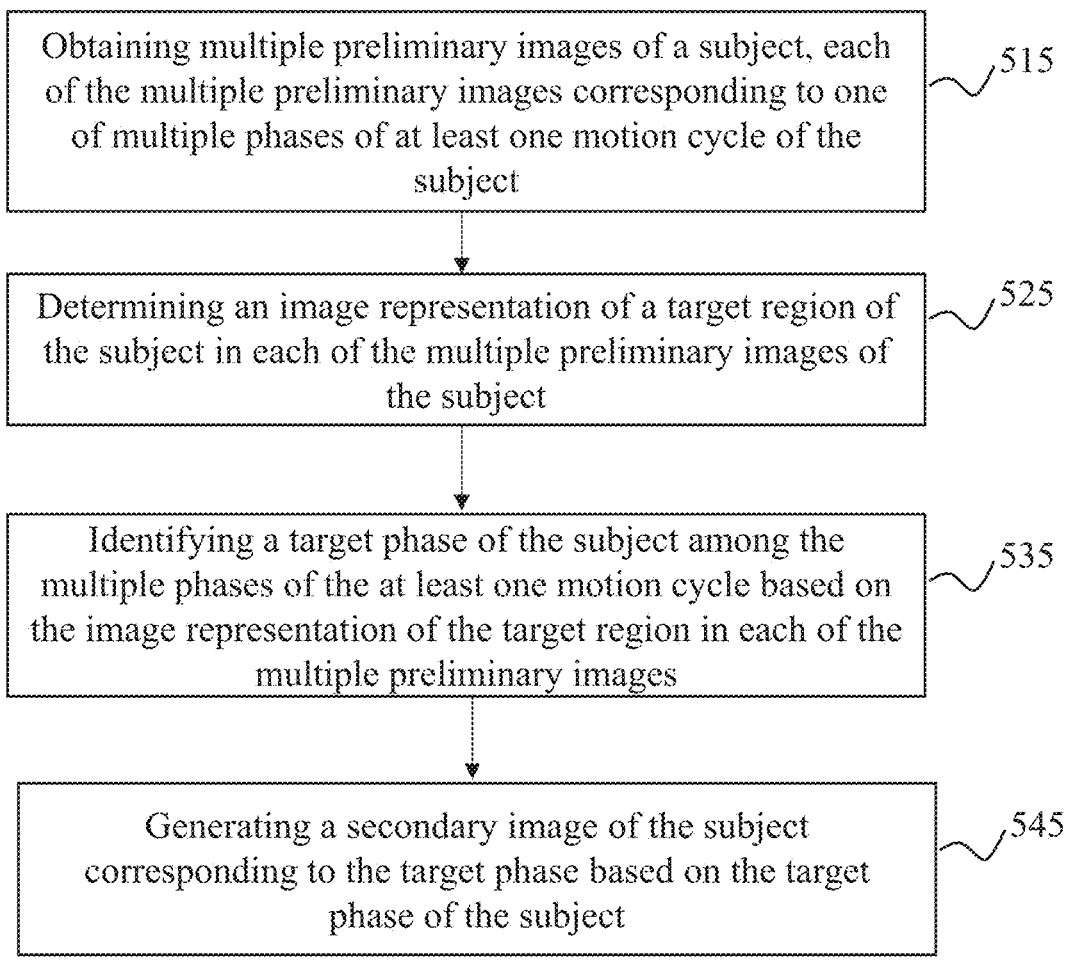
FIG. 5B is a flowchart illustrating an exemplary process for generating one or more images of the subject according to some embodiments of the present disclosure.

FIG. 5B is a flowchart illustrating an exemplary process for generating one or more images of the subject according to some embodiments of the present disclosure. In some embodiments, the process 505 may be executed by the imaging system 100. For example, the process 505 may be implemented as a set of instructions (e.g., an application) stored in a storage device (e.g., the storage device 150). The modules described in FIG. 4 and/or the processor 210 may execute the set of instructions and may accordingly be directed to perform the process 505. The operations of the illustrated process presented below are intended to be illustrative. In some embodiments, the process 505 may be accomplished with one or more additional operations not described and/or without one or more of the operations discussed. Additionally, the order of the operations of process 505 illustrated in FIG. 5A and described below is not intended to be limiting.

In 515, the processing device 140 (e.g., the obtaining module 410 or the processor 210) may obtain multiple preliminary images of the subject, each of the multiple preliminary images corresponding to one of multiple phases of at least one motion cycle of the subject. In some embodiments, the multiple preliminary images may be obtained from a storage device (e.g., the storage device 150, a cloud storage, etc.) The multiple preliminary images may be reconstructed based on original scanning data of a subject. The original scanning data may correspond to the multiple phases of the at least one motion cycle of the subject. More details regarding the generation of the multiple preliminary images are provided with reference to the operations 510 and 520 of the process 500.

The operations 525 through 545 in the process 505 may be the same as or similar to the operations 530 through 550, respectively, the descriptions of which are not repeated here.

Figure 6:
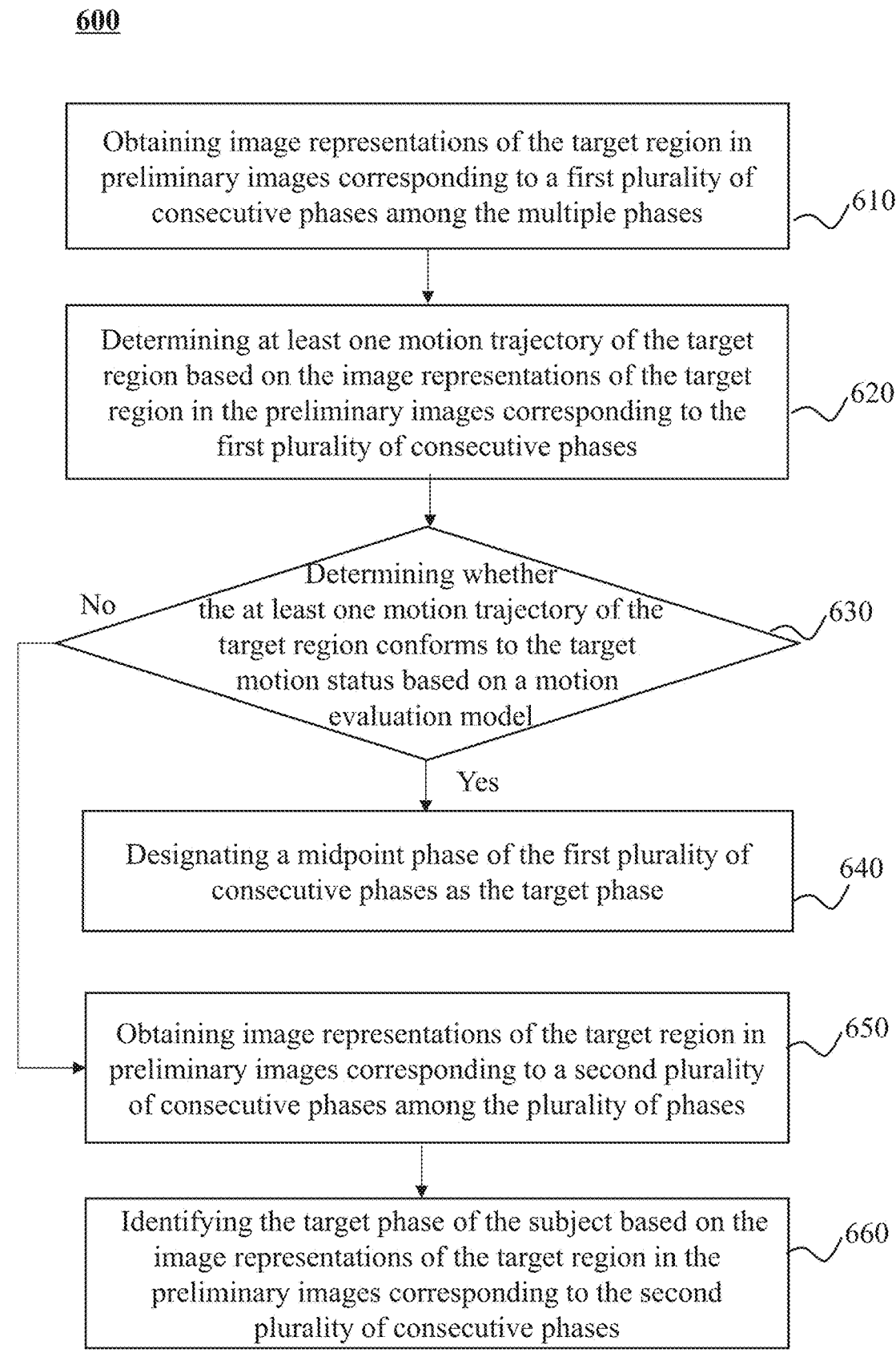
FIG. 6 is a flowchart illustrating an exemplary process for determining a target phase according to some embodiments of the present disclosure.

FIG. 6 is a flowchart illustrating an exemplary process for determining a target phase according to some embodiments of the present disclosure. In some embodiments, the process 600 may be executed by the imaging system 100. For example, the process 600 may be implemented as a set of instructions (e.g., an application) stored in a storage device (e.g., the storage device 150). The modules described in FIG. 4 and/or the processor 210 may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting. In some embodiments, the process 600 may be performed by the target phase identification module 430.

In 610, the processing device 140 (e.g., the processor 210) may obtain image representations of the target region in preliminary images corresponding to a first plurality of consecutive phases among the multiple phases.

In some embodiments, the first plurality of consecutive phases may correspond to continuous motions of the subject or a portion thereof (e.g., the target region) in a motion cycle. Merely by way of example, according to a scanning protocol, a motion cycle of a subject may include seven phases. The seven phases may be numbered in sequence according to data acquisition time points corresponding to the seven phases. The seven phases may include a first phase, a second phase, a third phase, a fourth phase, a fifth phase, a sixth phase and a seventh phase. The first plurality of consecutive phases may be an odd number (e.g., 3, 5, or 7) of consecutive phases among the seven phases.

If the subject includes the heart of a patient, coronary arteries of the heart may be taken as an example of the target region of the subject. Assuming that the first plurality of consecutive phases include three consecutive phases in the motion cycle, the processing device 140 may obtain image representations of the coronary arteries in preliminary images corresponding to the three consecutive phases. For example, the three consecutive phases may include the first phase, a second phase, and a third phase. As another example, the three consecutive phases may include the second phase, the third phase, and the fourth phase. As a further example, the three consecutive phases may include the third phase, the fourth phase, and the fifth phase. As still a further example, the three consecutive phases may include the fifth phase, the sixth phase, and the seventh phase.

The processing device 140 may obtain image representations of the target region in preliminary images corresponding to the first plurality of consecutive phases. In some embodiments, the processing device 140 may obtain at least one feature element of the target region and/or relevant information of the at least one feature element in a preliminary image corresponding to each of the first plurality of consecutive phases. Merely by way of example, the processing device 140 may obtain coordinates of pixels on a centerline of a coronary artery in a preliminary image corresponding to each of the first plurality of consecutive phases.

In 620, the processing device 140 (e.g., the processor 210) may determine at least one motion trajectory of the target region based on the image representations of the target region in the preliminary images corresponding to the first plurality of consecutive phases.

In some embodiments, a motion trajectory may be a line connecting coordinates of pixels representing a same point of at least one feature element of the target region in the preliminary images. For example, a motion trajectory of a point (e.g., a start point, an end point, a midpoint, a point designated by a user, etc.) on a centerline of a coronary artery of the heart of a patient may be a line connecting pixels representing the same point in the preliminary images. The coordinates of the pixels representing the same point may be connected sequentially according to data acquisition time points corresponding to the phases of the preliminary images. The motion trajectory may reflect a variation of the position of a point of at least one feature element of the target region in the preliminary images. In some embodiments, the motion trajectory may be represented by a smooth curve, a function, etc. Merely for illustration, coordinates of pixels representing a same point on a centerline of a coronary artery in the preliminary images corresponding to the first plurality of consecutive phases, a function representing a motion trajectory of the point on the centerline of the coronary artery may be determined. The at least one motion trajectory of the target region may be determined after the processing device 140 determines a motion trajectory for each of at least one point of the feature element of the target region.

In 630, the processing device 140 (e.g., the processor 210) may determine whether the at least one motion trajectory of the target region conforms to the target motion status based on a motion evaluation model.

In some embodiments, a motion evaluation model may be obtained. In some embodiments, the motion evaluation model may include a machine learning model (e.g., a neural network model, a deep learning model, etc.). Merely by way of example, the motion evaluation model may include a deep belief network (DBN), a Stacked Auto-Encoders (SAE), a logistic regression (LR) model, a support vector machine (SVM) model, a decision tree model, a Naive Bayesian Model, a random forest model, or a Restricted Boltzmann Machine (RBM), a Gradient Boosting Decision Tree (GBDT) model, a LambdaMART model, an adaptive boosting model, a recurrent neural network (RNN) model, a convolutional network model, a hidden Markov model, a perceptron neural network model, a Hopfield network model, or the like, or any combination thereof.

In some embodiments, the motion evaluation model may be a model trained based on sample data. The sample data may include a plurality of sample image sets. Each of the plurality of sample image sets may include sample images of a target region of a subject corresponding to a plurality of consecutive phases in a motion cycle of the subject. The target region of the subject may undergo a relatively smooth motion over the plurality of consecutive phases. In some embodiments, each of the plurality of sample image sets may include CT images of a target region of a subject (e.g., coronary arteries of the heart of a patient) corresponding to two or more consecutive phases in at least one motion cycle of the subject. In some embodiments, sample trajectories of target regions in the plurality of sample image sets may be determined and used to train a preliminary motion evaluation model (e.g., including a preliminary curve, a preliminary function, etc.). The sample trajectories of target regions may be input into the preliminary motion evaluation model, and the preliminary motion evaluation model may be updated (e.g., by updating one or more parameters of the preliminary curve, the preliminary function, etc.) iteratively until a condition is satisfied (e.g., a loss function reaching convergence). The updated motion evaluation model determined in a latest iteration may be designated as the motion evaluation model. The processing device 140 may input the at least one motion trajectory of the target region into the motion evaluation model. The output of the motion evaluation model may include a determination result as to whether the at least one motion trajectory of the target region conforms to the target motion status.

In 640, the processing device 140 (e.g., the processor 210) may designate a midpoint phase of the first plurality of consecutive phases as the target phase.

In some embodiments, if the at least one motion trajectory of the target region conforms to the target motion status, the midpoint phase of the first plurality of consecutive phases may be determined. As used herein, the midpoint phase refers to a middle phase among the first plurality of consecutive phases. For instance, if the first plurality of consecutive phases include the first phase, the second phase, and the third phase among the seven phases, the second phase may be determined as the midpoint phase. In some embodiments, the midpoint phase may be determined as the target phase.

In 650, the processing device 140 (e.g., the processor 210) may obtain image representations of the target region in preliminary images corresponding to a second plurality of consecutive phases among the plurality of phases.

In some embodiments, if any one of the at least one motion trajectory of the target region does not conform to the target motion status, the processing device 140 may obtain image representations of the target region in preliminary images corresponding to a second plurality of consecutive phases among the multiple phases. The second plurality of consecutive phases may be different from the first plurality of consecutive phases. For example, if the first plurality of consecutive phases include the first phase, the second phase, and the third phase, the second plurality of consecutive phases may include, for example, the second phase, the third phase, and the fourth phase. A count of the second plurality of consecutive phases may be the same as or different from a count of the first plurality of consecutive phases. For example, if the first plurality of consecutive phases include the first phase, the second phase, and the third phase, the second plurality of consecutive phases may include, for example, the second phase, the third phase, the fourth phase, the fifth phase, and the sixth phase.

In 660, the processing device 140 (e.g., the processor 210) may identify the target phase of the subject based on the image representations of the target region in the preliminary images corresponding to the second plurality of consecutive phases.

In some embodiments, the processing device 140 may repeat operations 620 through 650 to determine whether at least one motion trajectory of the target region determined based on image representations of the target region in the preliminary images corresponding to the second plurality of consecutive phases conforms to the target motion status. If the at least one motion trajectory of the target region conforms to the target motion status, a midpoint phase of the second plurality of consecutive phases may be determined as the target phase. Otherwise, the processing device 140 may further obtain image representations of the target region in preliminary images corresponding to another plurality (e.g., a third plurality, a fourth plurality, etc.) of consecutive phases among the plurality of phases, and determine whether at least one motion trajectory of the target region determined based on the another plurality of consecutive phases conforms to the target motion status. The process 600 may terminate until at least one motion trajectory of the target region in preliminary images corresponding to a specific count of consecutive phases among the multiple phases conforms to the target motion status or the multiple phases in the at least one motion cycle are traversed.

It should be noted that the above description is merely provided for the purposes of illustration, and not intended to limit the scope of the present disclosure. For persons having ordinary skills in the art, multiple variations or modifications may be made under the teachings of the present disclosure. For example, preliminary images with relatively low quality (e.g., a segmentation of the target region from the preliminary image fails) may be filtered out of the multiple preliminary images before the process 600 starts. However, those variations and modifications do not depart from the scope of the present disclosure.

Figure 7:
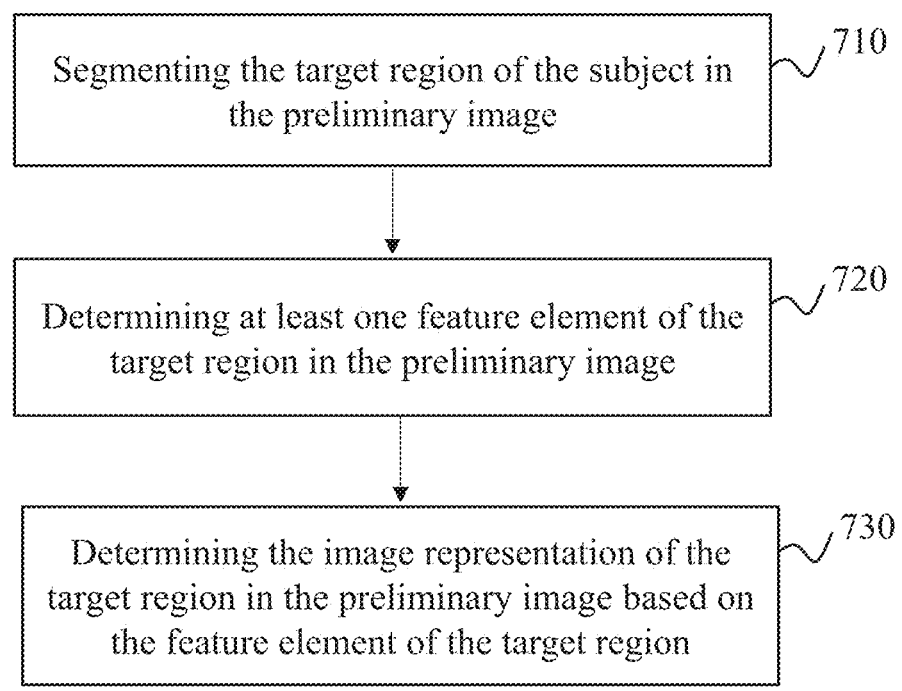
FIG. 7 is a flowchart illustrating an exemplary process for determining an image representation of a target region in a preliminary image according to some embodiments of the present disclosure.

FIG. 7 is a flowchart illustrating an exemplary process for determining an image representation of a target region in a preliminary image according to some embodiments of the present disclosure. In some embodiments, the process 700 may be executed by the imaging system 100. For example, the process 700 may be implemented as a set of instructions (e.g., an application) stored in a storage device (e.g., the storage device 150). The modules described in FIG. 4 and/or the processor 210 may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting. In some embodiments, the process 700 may be executed by the target phase identification module 430.

In 710, the processing device 140 (e.g., the processor 210) may segment the target region of the subject in the preliminary image.

In some embodiments, the target region may be segmented using a segmentation technique or a segmentation model. For example, for a preliminary image of the heart of a patient, coronary arteries of the heart may be segment using the segmentation technique or the segmentation model. Exemplary segmentation techniques may include a threshold-based segmentation technique, an edge-based segmentation technique, a region-based segmentation technique, a graph theory-based segmentation technique, an energy functional-based segmentation technique, a clustering algorithm, or the like, or any combination thereof. The threshold-based segmentation technique may include an Otsu method, a minimum error method, a maximum entropy method, or the like. The edge-based segmentation technique may be based on differential operators, for example, a Robert operator, a Prewitt operator, a Sobel operator, a Laplacian operator, a Canny operator, etc. The region-based segmentation technique may include a region growth, a region split and merge technique, a watershed technique, or the like. The graph theory-based segmentation technique may include a minimum supporting tree technique, a Normalized Cut technique, a Min-Max Cut technique, a Graph Cut technique, or the like. The energy functional-based segmentation technique may be an active contour model and an algorithm developed on this basis, such as a snake model, a level set method, or the like. The clustering algorithm may include a fuzzy c-means clustering algorithm, a K-means clustering algorithm, or the like.

Exemplary segmentation models may include a deep belief network (DBN), a Stacked Auto-Encoders (SAE), a logistic regression (LR) model, a support vector machine (SVM) model, a decision tree model, a Naive Bayesian Model, a random forest model, or a Restricted Boltzmann Machine (RBM), a Gradient Boosting Decision Tree (GBDT) model, a LambdaMART model, an adaptive boosting model, a recurrent neural network (RNN) model, a convolutional network model, a hidden Markov model, a perceptron neural network model, a Hopfield network model, or the like, or any combination thereof. In some embodiments, the segmentation model may be a neural network model. In some embodiments, the segmentation model may be trained based on a plurality of sample images of various subjects. Features of target regions of the subjects may be extracted from the plurality of sample images, and used to train the segmentation model.

In 720, the processing device 140 (e.g., the processor 210) may determine at least one feature element of the target region in the preliminary image.

In some embodiments, the at least one feature element of the target region may include at least one feature point of the target region, at least one feature of the target region, at least one feature region of the target region, etc. In some embodiments, the at least one feature point of the target region may include a center point of the target region. For example, for specific tissue of a lung of a patient, a center point of the specific tissue may be determined as the feature element of the target region. In some embodiments, the center point of the target region may be a geometric center point of the target region.

In some embodiments, the at least one feature of the target region may include a centerline of the target region, a boundary of the target region, etc. For example, for a coronary artery of the heart of a patient, a centerline of the coronary artery may be determined as the feature element of the target region. The centerline of the target region may be a hypothetic line located at a center of the target region. For example, a centerline of a coronary artery of the heart of a patient may be a hypothetic line located at a center of the coronary artery extending along the coronary artery. The processing device 140 may determine the centerline of the target region in various ways. Merely for illustration purposes, a set of midpoints in the target region may be determined. Each of the set of midpoints may be a midpoint of a line segment connecting an intersection between a straight line in a direction perpendicular to a length direction of the target region and a first boundary of the target region and another intersection between the straight line and a second boundary of the target region opposite to the first boundary. The centerline may be determined by connecting the set of midpoints sequentially.

In some embodiments, the at least one feature region of the target region may include a sub-region of the target region. For example, for a coronary artery of including one or more main blood vessels and/or one or more branch blood vessels, at least one sub-region representing the one or more main blood vessels of the coronary artery may be determined as the feature element of the target region.

In 730, the processing device 140 (e.g., the processor 210) may determine the image representation of the target region in the preliminary image based on the at least one feature element of the target region.

In some embodiments, the image representation of the target region in the preliminary image may be determined based on the at least one central point, at least one central line, and/or the at least one sub-region of the target region. For example, the image representation of a coronary artery in the preliminary image may be determined based on a centerline of the coronary artery.

In some embodiments, the image representation of the target region may include relevant information of the at least one feature element of the target region. The relevant information of the feature element may include coordinate information (e.g., coordinates) of the feature element with respect to a coordinate system, such as an image coordinate system, the coordinate system 116, etc. The relevant information of the feature element may also include information such as a shape of a centerline, a count of pixels on the centerline, an area of the sub-region, a shape of the sub-region, etc.

It should be noted that the above description is merely provided for the purposes of illustration, and not intended to limit the scope of the present disclosure. For persons having ordinary skills in the art, multiple variations or modifications may be made under the teachings of the present disclosure. For example, the target region may be segmented from an image (e.g., a preliminary image) manually by a user (e.g., a doctor, an imaging specialist, a technician). However, those variations and modifications do not depart from the scope of the present disclosure.

Figure 8:
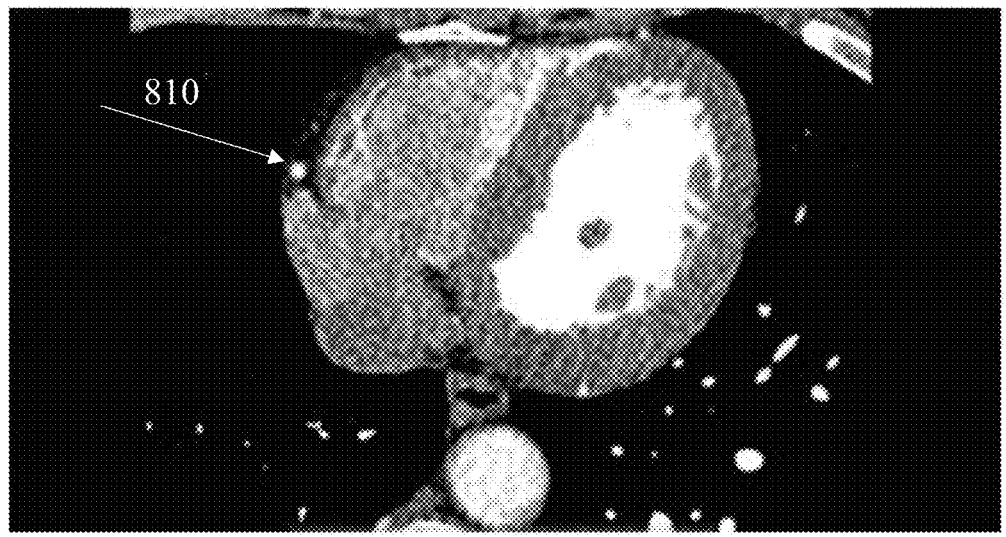
FIG. 8 illustrates an image of a coronary artery of the heart of a patient corrected based on the target phase identified with reference to the process 500 or 600 according to some embodiments of the present disclosure.
Figure 9:
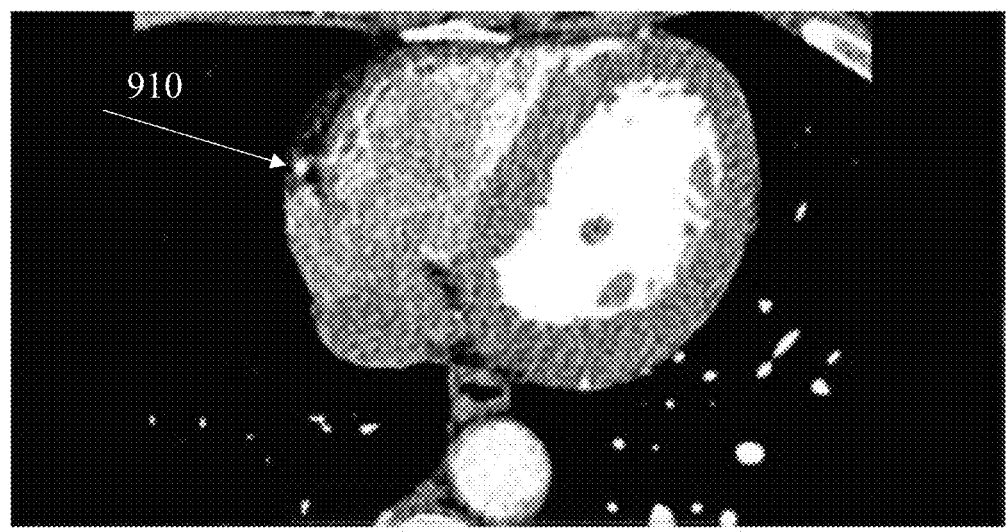
FIG. 9 illustrates an image of the coronary artery of the heart of the patient corrected in a conventional way without using the target phase according to some embodiments of the present disclosure.

FIG. 8 illustrates an image of a coronary artery of the heart of a patient corrected based on the target phase identified with reference to the process 500 or 600 according to some embodiments of the present disclosure. FIG. 9 illustrates an image of the coronary artery of the heart of the patient corrected in a conventional way without using the target phase according to some embodiments of the present disclosure. White arrows 810 and 910 in FIGS. 8 and 9 point to a same coronary artery. The imaging quality of FIG. 8 is better than that of FIG. 9. The application of the target phase identified according to the processes 500 and 600 may improve the quality of reconstructed images effectively.

Figure 10:
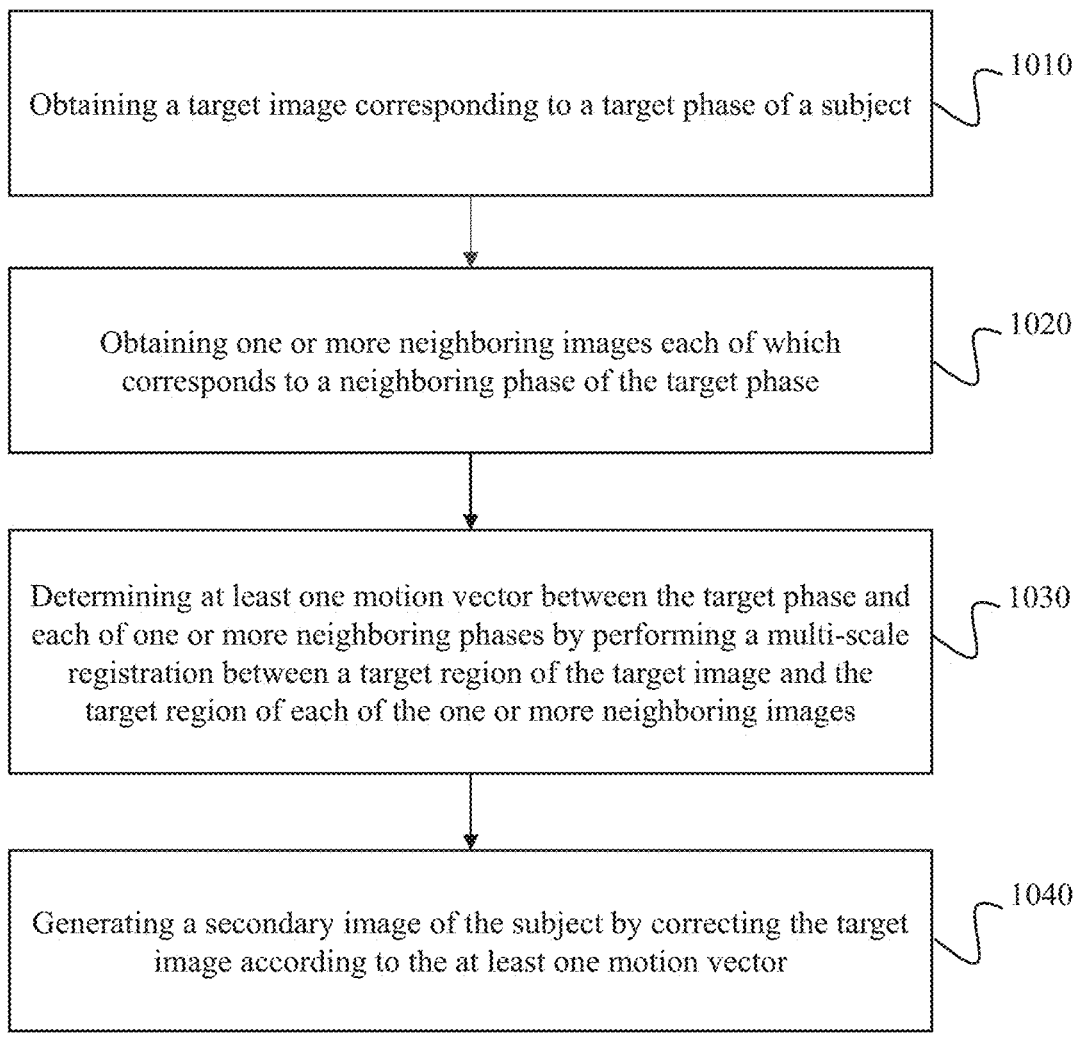
FIG. 10 is a flowchart illustrating an exemplary process for motion correction according to some embodiments of the present disclosure.

FIG. 10 is a flowchart illustrating an exemplary process for motion correction according to some embodiments of the present disclosure. In some embodiments, the process 1000 may be implemented as a set of instructions (e.g., an application) stored in the storage device 150, storage 220, or storage 390. The processing device 140, the processor 210, and/or the CPU 340 may execute the set of instructions, and when executing the instructions, the processing device 140, the processor 210, and/or the CPU 340 may be configured to perform the process 1000. The operations of the illustrated process presented below are intended to be illustrative. In some embodiments, the process 1000 may be accomplished with one or more additional operations not described, and/or without one or more of the operations discussed. Additionally, the order of the operations of the process 1000 illustrated in FIG. 10 and described below is not intended to be limiting. In some embodiments, the operation 550 of the process 500 as illustrated in FIG. 5A may be performed according to the process 100. The process 1000 may be provided to achieve a better effect for reducing motion artifacts in medical images by processing scanning data of the subject.

In 1010, the processing device 140 (e.g., the obtaining module 410 and/or the target phase identification module 430) may obtain a target image corresponding to a target phase of the subject.

In some embodiments, the motion status of the subject corresponding to different phases may be different. For example, as for a lung of a patient, a motion cycle of the lung may include multiple phases such as an initial inspiratory phase, a late inspiratory phase, a breath-holding phase, an early expiratory phase, and a late expiratory phase. As another example, as for the heart of a patient, a motion cycle of the heart may include multiple phases such as an isovolumetric systole phase, a rapid ejection phase, a slow ejection phase, a protodiastolic phase, an isovolumetric diastolic phase, a rapid filling phase, a slow filling phase, and an atrial systole phase.

In some embodiments, for conveniently describing the motion correction process 1000 as illustrated in FIG. 10, the target phase may also be referred to as a reference phase among the multiple phases of the subject. The processing device 140 may identify the target phase of the subject from the multiple phases. The target phase may be identified as described in FIG. 5, the descriptions of which is not repeated here. In some embodiments, during the imaging process, a gating device (e.g., an electrocardiograph (ECG) device, or a respiratory gating device) may be operably connected to the subject for detecting different phases of the subject. The processing device 140 may determine the target phase according to output signals of the gating device. Alternatively, the processing device 140 may obtain the target phase directly according to a user instruction (e.g., a user input) input by a user via, e.g., a terminal device (e.g., the terminal device 130).

In some embodiments, the target image corresponding to the target phase of the subject may be a three-dimensional (3D) image. The target image may also be referred to as an image to be corrected. The 3D target image may include a set or stack of 2D images (e.g., a set of image slices) obtained based on scanning data acquired at a data acquisition angle range corresponding to the target phase. In some embodiments, the processing device 140 may obtain a set of original scanning data corresponding to the target phase (also referred to as target scanning data) from the original scanning data obtained in, for example, 510 of the process 500. The processing device 140 may reconstruct the target image based on the target scanning data. Alternatively, the processing device 140 may obtain the target image from a storage device (e.g., the storage device 150). In some embodiments, the set of the original scanning data corresponding to the target phase may correspond to multiple data acquisition angles or a data acquisition angle range.

In 1020, the processing device 140 (e.g., the obtaining module 410 and/or the target phase identification module 430) may obtain one or more neighboring images each of which corresponds to a neighboring phase of the subject.

In some embodiments, the processing device 140 may obtain one or more neighboring phases of the target phase. A neighboring phase used herein refers to a phase immediately next to (e.g., immediately subsequent to, immediately prior to) the target phase, or a phase that belongs to a group of consecutive phases including the target phase as described elsewhere in the present disclosure. The one or more neighboring phases and the target phases may be consecutive phases in at least one motion cycle of the subject. For example, the multiple phases within a same motion cycle of the subject may be numbered as 1, 2, 3, . . . , and 8 according to a time sequence of the multiple phases. If the target phase is phase 3, the one or more neighboring phases may include phase 2 and phase 4. Alternatively, the one or more neighboring phases may include phase 2, phase 4, and phase 5. In some embodiments, the processing device 140 may identify the one or more neighboring phases of the target phase in a way similar to the identification of the target phase as described in FIG. 5, the description of which is not repeated here. Alternatively, the processing device 140 may obtain the one or more neighboring phases according to a user instruction or a gating device.

In some embodiments, the processing device 140 may obtain a set of original scanning data (also referred to as a set of neighboring scanning data) corresponding to each of the one or more neighboring phases. A neighboring phase may relate to multiple time points. A set of original scanning data corresponding to a neighboring phase may include multiple pieces of the original scanning data, each piece corresponding to a time point of the multiple time points. The processing device 140 may reconstruct one of the one or more neighboring images based on a set of neighboring scanning data. Each of the neighboring images may be a 3D image including a set or stack of 2D images corresponding to scanning data acquired in an data acquisition angle range corresponding to one of the one or more neighboring phases. Alternatively, the processing device 140 may obtain the one or more neighboring images from a storage device (e.g., the storage device 150). Merely by way of example, the one or more neighboring phases may include a first neighboring phase immediately prior to the target phase and a second neighboring phase immediately subsequent to the target phase.

Data (e.g., scanning data, motion information) from multiple motion cycles may be pooled together for analysis. For instance, scanning data and/or motion information of a same neighboring phase from different motion cycles may be pooled together for determining a neighboring image. As used herein, data obtained based on imaging and/or measurement (e.g., gating) performed at a time point within a motion cycle may be deemed corresponding to a phase by comparing the time point with respect to one or more temporal features of the motion cycle including, e.g., a starting time, an ending time, a midpoint of the motion cycle.

In some embodiments, data obtained based on imaging and/or measurement (e.g., gating) performed at different time points within different motion cycle may be deemed corresponding to a same phase. In some embodiments, data obtained based on imaging and/or measurement (e.g., gating) performed within a same phase may be pooled together for determining an image corresponding to the phase. For the ease of description, the following description is provided with respect to scanning data and/or motion data from one motion cycle. It is understood that this is for illustration purposes and not intended to be limiting.

Figure 11:
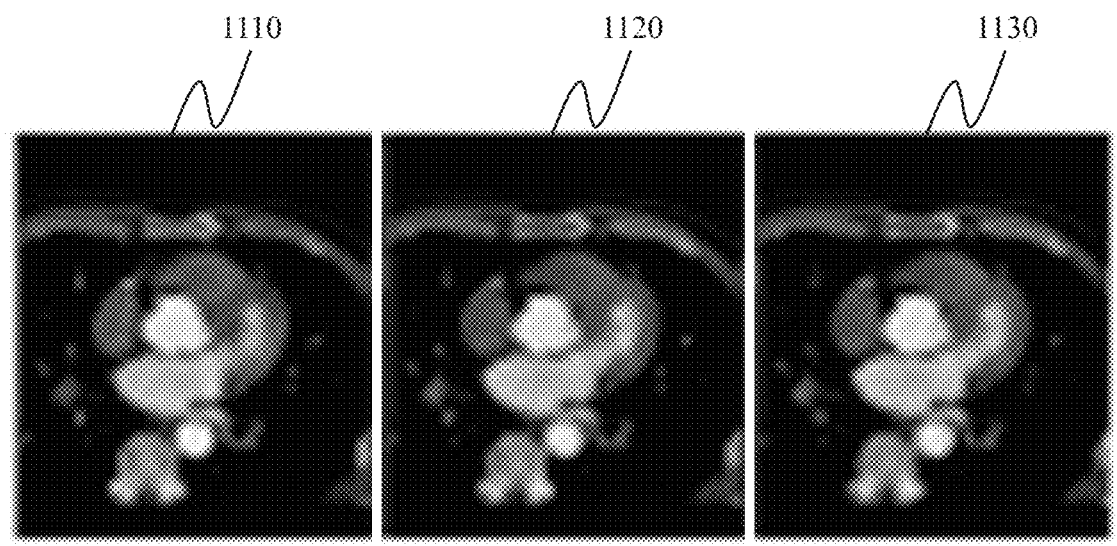
FIG. 11 is a schematic diagram illustrating an exemplary target image and neighboring images of the target image according to some embodiments of the present disclosure.

The first neighboring phase may correspond to a first time period (t1) of the motion cycle. The second neighboring phase may correspond to a second time period (t2) of the motion cycle. The target phase may correspond to a third time period (t3) of the motion cycle. In the motion cycle, the third time period t3 may be between the first time period t1 and the second time period t2. The processing device 140 may obtain a first neighboring image corresponding to the first neighboring phase and a second neighboring image corresponding to the second neighboring phase. As shown in FIG. 11, an image 1110 may represent the first neighboring image; an image 1120 may represent the target image; and an image 1130 may represent the second neighboring image.

In 1030, the processing device 140 (e.g., the correction module 440) may determine at least one motion vector between the target phase and each of the one or more neighboring phases by performing a multi-scale registration between a target region of the target image and the target region of each of the one or more neighboring images. That is, the target and a neighboring phases may correspond to at least one motion vector.

Figure 12A:
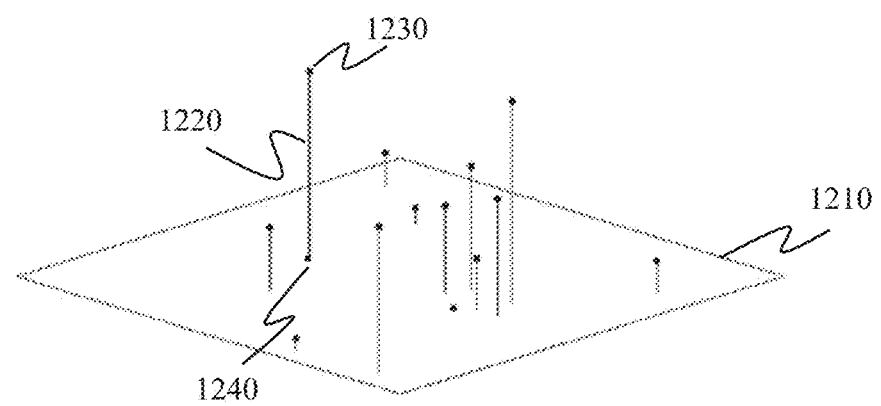
FIG. 12A is a schematic diagram illustrating an exemplary representation of registrations according to some embodiments of the present disclosure.
Figure 12B:
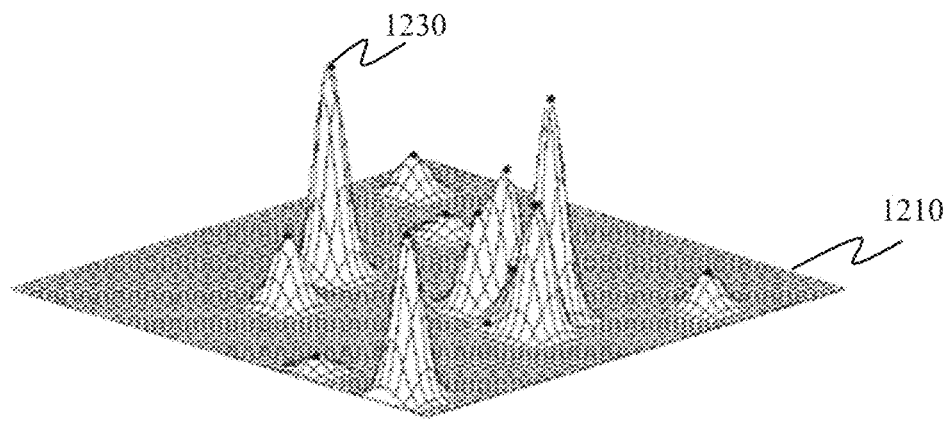
FIGS. 12B-12D are schematic diagrams illustrating exemplary registration results using different scales according to some embodiments of the present disclosure.
Figure 12C:
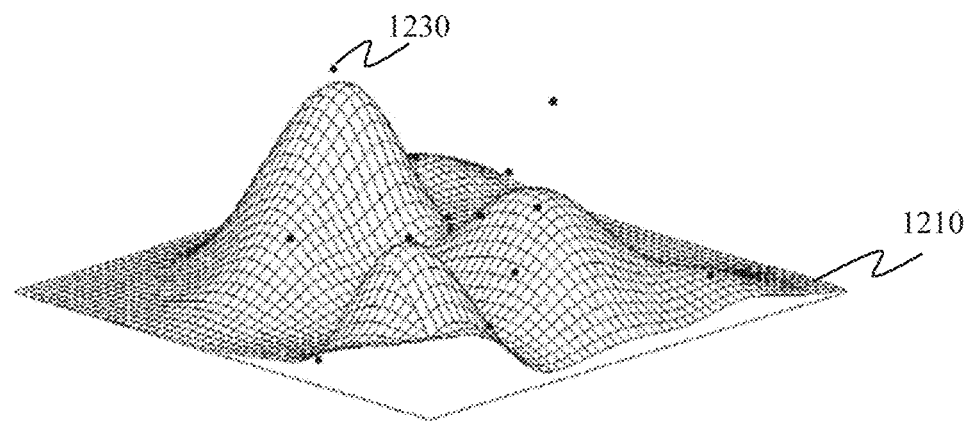
Figure 12D:
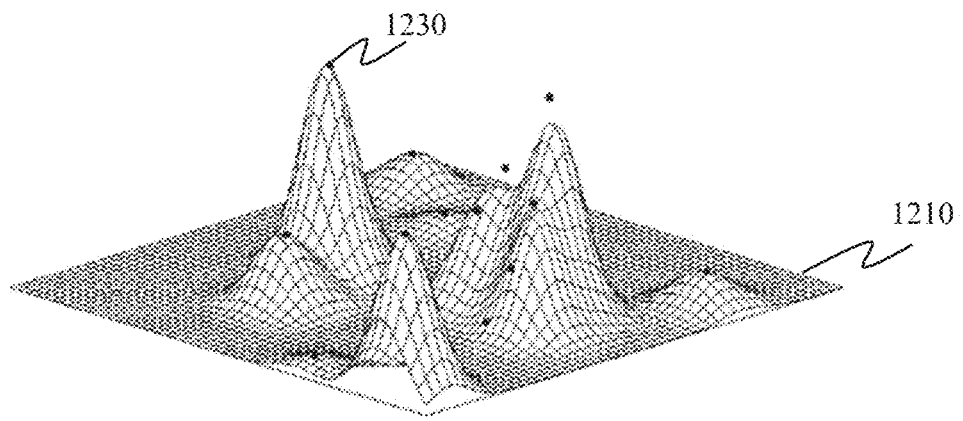

As used herein, the multi-scale registration refers to a registration using at least two scales. Different scales may achieve different registration effects. The larger the scale is, the less precise the registration may be. For illustration purposes, FIG. 12A is a schematic diagram illustrating an exemplary representation of registrations according to some embodiments of the present disclosure. FIGS. 12B-12D are schematic diagrams illustrating exemplary registration results using different scales according to some embodiments of the present disclosure.

As shown in FIG. 12A, an image 1210 corresponding to a first time point (or a first phase) may include a plurality of initial points 1240 (although only one of the initial point shown in FIG. 12A is provided with the reference numeral 1240). By way of registration, correspondence between each of the plurality of initial points 1240 of the first time point (or the first phase) and a point 1230 in another image (the another image not shown in FIG. 12A) of a second time point (or a second phase) may be determined in which the initial points 1240 and the corresponding point 1230 represent a same physical element (e.g., a portion of the subject being imaged). A line segment 1220 shown in FIG. 12A illustrates the motion of the physical element of the subject between the first time point (or the first phase) and the second time point (or the second phase).

FIGS. 12B-12D illustrate registration results (e.g., a B-spline registration) using a same registration algorithm but three different scales for registering the plurality of initial points 1240 on the image 1210 with corresponding points 1230 (although only one of the points shown in FIG. 12A is provided with the reference numeral 1230). When the B-spline registration is used, the image 1210 may be divided into a plurality of grids. Each of the plurality of initial points 1240 may correspond to one of the plurality of grids. The B-spline registration may cause a variation not only of the plurality of initial points 1240 that relates to or reflect the motion of the physical elements of the subject corresponding to the initial points 1240 but also of one or more initial points adjacent to and/or surrounding the plurality of initial points 1240 noted in FIG. 12A. As shown in FIG. 12B, the plurality of initial points 1240 on the image 1210 may be registered using a scale A, and a first count (number) of initial points may be registered to their corresponding points 1230. As shown in FIG. 12C, the plurality of initial points 1240 on the image 1210 may be registered using a scale B, and a second count (number) of initial points 1240 may be registered to their corresponding points 1230. As shown in FIG. 12D, the plurality of initial points 1240 on the image 1210 may be registered using a scale C, and a third count (number) of initial points 1240 may be registered to their corresponding points 1230. The scale A may be greater than the scale C. The scale C may be greater than the scale B. The first count corresponding to the scale A may be greater than the third count corresponding to the scale C. The third count corresponding to the scale C may be greater than the second count corresponding to the scale B. Accordingly, a registration effect (assessed based on the number (or count) of initial points 1240 successfully registered) corresponding to the scale C may be between a registration effect corresponding to the scale A and a registration effect corresponding to the scale B.

In some embodiments, the processing device 140 may determine a feature of the target region in each of the neighboring images. The feature of the target region in each of the neighboring images may also be referred to as target feature. The processing device 140 may also determine a feature of the target region in the target image. The feature of the target region in the target image may also be referred to as reference feature. The target feature or the reference feature may be one or more points, a skeleton, a line (e.g., a center line, a boundary line), a surface, one or more voxels, etc. of the target region. In some embodiments, the target feature and the reference feature may be of a same type. For example, both the target feature and the reference feature may be center lines of the target region. As another example, both the target feature and the reference feature may be boundary lines of the target region. Further, the processing device 140 may perform the multi-scale registration based on the target feature in each of the neighboring images and the reference feature in the target image.

In some embodiments, the processing device 140 may register the target feature in each of the one or more neighboring images with the target image using at least two scales (e.g., two scales, three scales, four scales, etc.). Merely by way of example, the at least two scales may include a first scale and a second scale. The second scale may be finer than the first scale. For a neighboring image (e.g., a neighboring image corresponding to a neighboring phase immediately prior to the target phase), the processing device 140 may perform a first registration by registering the target feature in the neighboring image with the target image using the first scale. The processing device 140 may further perform a second registration by registering the registered target feature with the target image using the second scale. In some embodiments, the multi-scale registration may terminate when a termination condition is satisfied. For example, the processing device 140 may terminate the multi-scale registration process until a final registered target feature is consistent or substantially consistent with the reference feature, e.g., a similarity (e.g., a length difference, a shape difference, etc.) between the final registered target feature and the reference feature may be less than a preset threshold.

In some embodiments, the processing device 140 may determine the at least one motion vector between the target phase and each of the one or more neighboring phases according to the result of the multi-scale registration. Taking a coronary artery of the heart of a patient as an example, the processing device 140 may register a target center line of the coronary artery in a neighboring image with a reference centerline of the coronary artery in the target image using at least two scales. For a neighboring image (e.g., a neighboring image corresponding to a neighboring phase immediately prior to the target phase), the processing device 140 may determine at least one motion vector between the target phase and the neighboring phase corresponding to the neighboring image based on the at least two scales. Each of the at least one motion vector may include a motion amplitude and a motion direction. The at least one motion vector between the target phase and the neighboring phase may reflect a variation of coordinates of pixels on the target centerline with respect to coordinates of pixels on the reference centerline, i.e., motion information of the coronary artery between the neighboring phase and the target phase. That is, the coronary artery may move from the neighboring phase to the target phase according to the least one motion vector. As another example, as shown in FIG. 11, the processing device 140 may register the first neighboring image 1110 with the target image 1120 by the multi-scale registration and determine at least one first motion vector between the first time period t1 and the target time period t3 (i.e., between the first neighboring phase and the target phase). The processing device 140 may register the target image 1120 with the second neighboring image 1130 by the multi-scale registration and determine at least one second motion vector between the target time period t3 and the second time period t2 (i.e., between the target phase and the second neighboring phase). Accordingly, for a specific time point (or phase), the processing device 140 may determine at least one motion vector between the specific time point with respect to a time point before the specific time point, i.e., at least one motion vector between a specific phase with respect to a neighboring phase immediately prior to the specific phase.

In some embodiments, the target region may include one or more sub-regions. At least a portion of the one or more sub-regions may have different motion amplitudes. The processing device 140 may determine one or more motion vectors for each of the one or more sub-regions, which reflects motion information of the sub-region. Accordingly, the processing device 140 may determine one or more motion vectors (i.e., the at least one motion vector) between the target phase and a neighboring phase. Each of the one or more motion vectors may correspond to one of the one or more sub-regions. The one or more motion vectors may form a motion vector filed. For example, the processing device 140 may segment the target region of the subject from the target image using, e.g., a segmentation algorithm or a segmentation model. The processing device 140 may divide the target region into two or more sub-regions. The processing device 140 may obtain a motion trend of each of the two or more sub-regions. As used herein, a motion trend of a sub-region may reflect an estimated motion amplitude of the sub-region. The motion trend of the sub-region may be determined according to priori knowledge (e.g., user experiences), a motion estimation model, etc., which is not limiting in the present disclosure. The processing device may determine a sub-region scale for each of the two or more sub-regions based on the motion trend of each of the two or more sub-regions. The processing device 140 may perform the multi-scale registration between each of the neighboring images and the target image based on the sub-region scale for each of the two or more sub-regions.

Taking a coronary artery of the heart of a patient as an example, the processing device 140 may divide the coronary artery into at least two branches and/or segmentations, each of which may be with different motion amplitudes. For illustration purposes, the at least two branches and/or segmentations may include a left coronary artery branch and a right coronary artery branch. The left coronary artery branch may correspond to a first motion trend reflecting a first motion amplitude. The right coronary artery branch may correspond to a second motion trend reflecting a second motion amplitude. Merely for illustration, the second motion amplitude may be smaller than the first motion amplitude. The processing device 140 may determine a first sub-region scale for a first sub-region of the target region based on the first motion trend of the first sub-region. The processing device 140 may determine a second sub-region scale for a second sub-region of the target region based on the second motion trend of the first sub-region. The second sub-region scale may be finer than the first sub-region scale. For each of the one or more neighboring images, the processing device 140 may determine the first sub-region and the second sub-region of the target region in the neighboring image. The processing device 140 may perform a first multi-scale registration between the first sub-region in the neighboring image and the first sub-region in the target image based on the first sub-region scale. The processing device 140 may determine at least one first sub-vector between the first sub-region in the neighboring image and the first sub-region in the target image based on a result of the first multi-registration. The processing device 140 may perform a second multi-scale registration between the second sub-region in the neighboring image and the second sub-region in the target image based on the second sub-region scale. The processing device 140 may determine at least one second sub-vector between the second sub-region in the neighboring image and the second sub-region in the target image based on the second sub-region scale based on a result of the second multi-registration. The at one motion vector between the target image and the neighboring image may include the at least one first sub-vector and the at least one the second motion vector.

In some embodiments, the processing device 140 may determine the at least one motion vector by registering, using at least two scales, each coordinate of pixels in the target feature with a coordinate of a corresponding pixel in the reference feature. Each of the at least one motion vector may correspond to a pixel.

In 1040, the processing device 140 (e.g., the correction module 440) may generate a secondary image of the subject by correcting the target image according to the at least one motion vector.

In some embodiments, the target image may include a plurality of pixels. The processing device 140 may perform a motion compensation for coordinates of the plurality of pixels. For example, the processing device 140 may identify target pixels corresponding to a motion artifact from the plurality of pixels. For each of the target pixels, the processing device 140 may correct the target pixel based on the at least one motion vector (e.g., by moving the target pixel according to the at least one motion vector). That is, coordinates of the target pixels may be compensated in dimensions such as the amplitude and/or the direction for removing the motion artifacts from the target image.

In some embodiments, the processing device 140 may divide original scanning data corresponding to the target image (e.g., the target scanning data) into multiple groups of divided scanning data. The processing device 140 may reconstruct multiple sub-images, each of which is reconstructed based on one of the multiple groups of divided scanning data. For example, the original scanning data of the target image may be target scanning data corresponding to a data acquisition angle range of M angles (e.g., 180°, 200°, 240°, etc.). The processing device 140 may divide the original scanning data into N groups based on a preset angle (e.g., 30°, 50°, 80°, etc.). N is an integer greater than 1. For instance, the target scanning data may correspond to a data acquisition angle range of 240° (i.e., M=240°). The target scanning data may be acquired during a scanning angle range from −120° to 120°. If the preset angle is 80°, the processing device 140 may divide the target scanning data into 3 groups (i.e., N=3) based on the preset angle of 80°. The 3 groups may include a first group including target scanning data acquired during a scanning angle range from −120° to −40°, a second group including target scanning data acquired during a scanning angle range from −40° to 40°, and a third group including target scanning data acquired during a scanning angle range from 40° to 120°, respectively. Taking the first group as an example, the processing device 140 may reconstruct a first sub-image based on the target scanning data of the first group. As the target scanning data of the first group is a portion of the target scanning data, the first sub-image may include less information than that in the target image, such that a resolution of the first sub-image may be less than the resolution of the target image. As another example, the processing device 140 may divide the original scanning data into N groups based on a preset parameter (denoted by P) relating to a count (or number of the N groups. P is an even integer greater than or equal to 2 (e.g., 2, 4, 6, 8 etc.). N may be equal to P plus 1 (i.e., N=P+1). For instance, when the preset parameter is 2, the original scanning data may be divided into 3 groups. The preset parameter may be a default setting of the imaging system 100 or set by a user of the imaging system 100.

In some embodiments, the processing device 140 may generate corrected sub-images by correcting the multiple sub-images according to the at least one motion vector. For example, for each of the multiple sub-images, the target scanning data corresponding to the sub-image may correspond to a portion of a data acquisition angle range corresponding to the target phase and be a portion of the target scanning data corresponding to the target phase. That is, the target scanning data corresponding to sub-image may be acquired during limited angles of a scanning angle range corresponding to the target phase. Each of the limited angles may correspond to an acquisition time point. Accordingly, the target scanning data corresponding to the sub-image may be acquired at different acquisition time points (also referred to as different time points) relating to the target time phase. The different time points may be centered or substantially centered by an acquisition time point corresponding to the target time phase. In some embodiments, the sub-image may include a plurality of intermediate sub-phasic images (e.g., 280 intermediate sub-phasic images), each of which is reconstructed based on target scanning data acquired at one of the different time points. The processing device 140 may obtain a phase midpoint of the sub-image. As used herein, the phase midpoint of the sub-image may refer to the middle time point of the different time points relating to the target phase. The processing device 140 may determine an intermediate sub-phasic images corresponding to the phase midpoint from the plurality of intermediate sub-phasic images. The processing device 140 may divide remaining intermediate sub-phasic images into a first portion and a second portion. The first portion may include at least one intermediate sub-phasic images corresponding to a time point before the phase midpoint. The second portion may include at least one intermediate sub-phasic images corresponding to a time point after the phase midpoint. The processing device 140 may obtain the one or more neighboring phases each corresponding to the at least one motion vector. As the at least one motion vector is between the target phase and each of the one or more neighboring phases, each of the one or more neighboring phases may correspond to the at least one motion vector.

For each of the plurality of the intermediate sub-phasic images, the processing device 140 may determine one or more motion vectors for the intermediate sub-phasic image based on a time point corresponding to the intermediate sub-phasic images and the one or more neighboring phases. For the intermediate sub-phasic images corresponding to a time point before the phase midpoint, the processing device 140 may obtain one or more first motion vectors from the at least one motion vector corresponding to each of the one or more neighboring phases, and generate a first corrected intermediate sub-phasic images by correcting the intermediate sub-phasic images according to the one or more first motion vectors. Each of the one or more first motion vectors may correspond to a neighboring phase occurs before the target phase. For the intermediate sub-phasic images corresponding to a time point after the phase midpoint, the processing device 140 may obtain one or more second motion vectors from the at least one motion vector each of the one or more neighboring phases, and generate a second corrected intermediate sub-phasic images by correcting the intermediate sub-phasic images according to the one or more second motion vectors. Each of the one or more second motion vectors may correspond to a neighboring phase occurs after the target phase. The intermediate sub-phasic images corresponding to the phase midpoint may need no motion correction as a time duration between the phase midpoint and each of the time points before and after the phase midpoint relating to the target phase may be relatively small and the intermediate sub-phasic images corresponding to the phase midpoint may include substantially no motion artifact. Accordingly, the processing device 140 may determine the corrected sub-image by fusing at least one first corrected intermediate sub-phasic images, the intermediate sub-phasic images corresponding to the phase midpoint, and at least one second corrected intermediate sub-phasic images. The fusing operation may refer to a combination operation for combining information in at least two images into an image.

Figure 13:
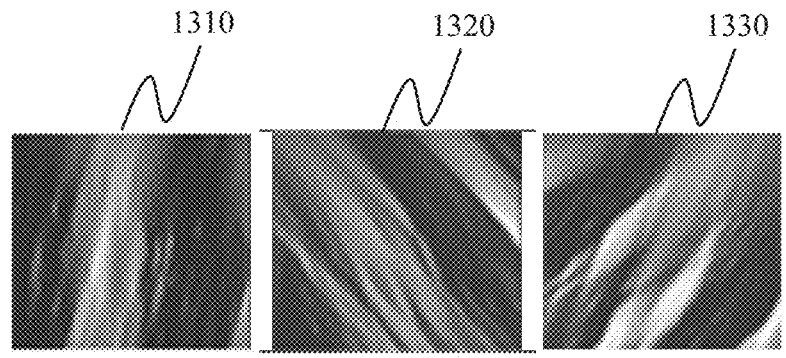
FIG. 13 is a schematic diagram illustrating an exemplary sub-image of a target image according to some embodiments of the present disclosure.
Figure 14:
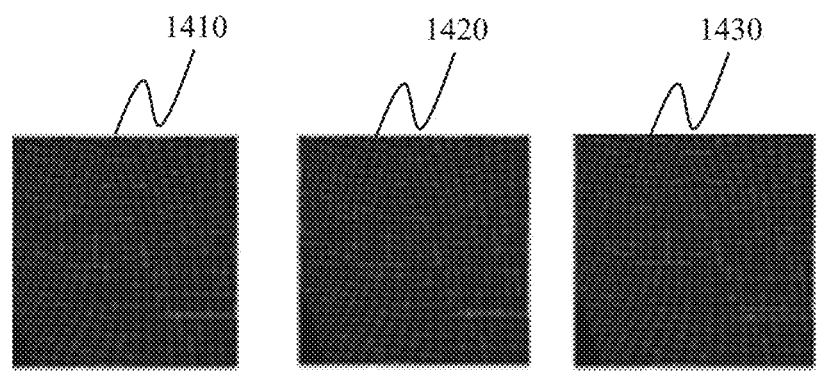
FIG. 14 is a schematic diagram illustrating exemplary motion vectors according to some embodiments of the present disclosure.

For instance, the target image 1120 as shown in FIG. 11 may include a sub-image that includes three intermediate sub-phasic images, e.g., a slice image 1310, a slice image 1320, and a slice image 1330 as shown in FIG. 13. The image 1320 may correspond to a phase midpoint of the target phase. The image 1310 may correspond to a time point of the target phase immediately prior to the phase midpoint. The image 1330 may correspond to a time point of the target phase immediately subsequent to the phase midpoint. The processing device 140 may generate a first corrected image by correcting the image 1310 according to one or more first motion vectors 1410 as shown in FIG. 14. The processing device 140 may generate a second corrected image by correcting the image 1330 according to one or more second motion vectors 1430 as shown in FIG. 14. The processing device 140 may generate a corrected target phase images by adding the first corrected image, the image 1320 and the corrected second image. Alternatively, the processing device 140 may generate a third corrected image by correcting the image 1320 according to one or more third motion vectors 1420 as shown in FIG. 14. The processing device 140 may generate the corrected sub-image by fusing the first corrected image, the third corrected image and the corrected second image. The third corrected image may be the same as the image 1320. That is, the one or more third vectors 1402 may be preset vectors than may not change information of the image 1320 during correction.

Figure 15A:
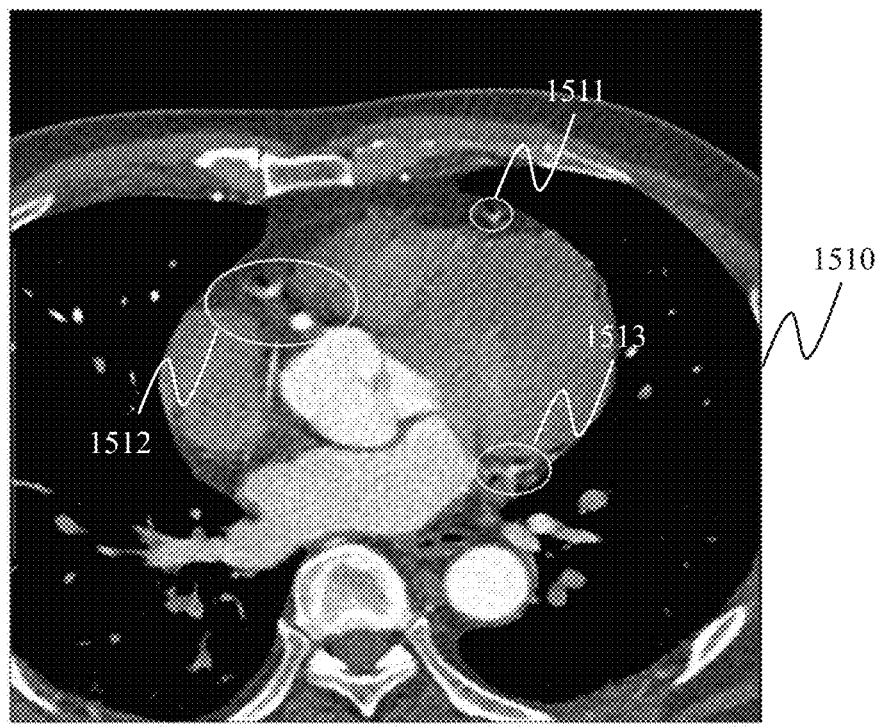
FIG. 15A is a schematic diagram illustrating an exemplary target image according to some embodiments of the present disclosure.
Figure 15B:
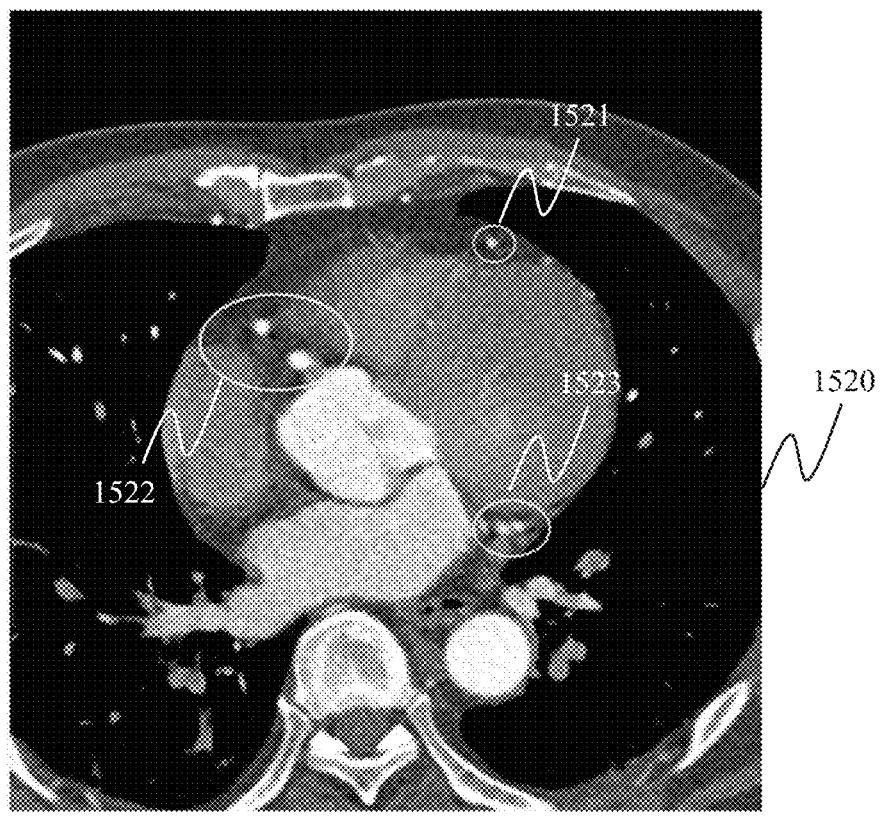
FIG. 15B is a schematic diagram illustrating an exemplary secondary image according to some embodiments of the present disclosure.

Further, the processing device 140 may generate the secondary image by fusing the corrected sub-images, which is similar to the generation of a sub-image by fusing corrected intermediate sub-phasic images. As shown in FIG. 15B, a secondary image 1520 may be determined by correcting a target image 1510 according to the process 1000. As shown in FIG. 15A, before motion correction, a portion of the coronary artery in the target image 1510 shows to be relatively blurry. For example, a region 1511, a region 1512, and a region 1513 show to be relatively blurry. As shown in FIG. 15B, the portion of the coronary artery in the secondary image 1520 may be clearer than that in the target image 1510. For example, a region 1521 shows to be clearer than the region 1511 in FIG. 15A. A region 1522 shows to be clearer than the region 1512 in FIG. 15A. A region 1523 shows to be clearer than the region 1513 in FIG. 15A. According to FIGS. 15A and 15B, the process 1000 provided by the present disclosure may be illustrated to be effective for motion correction.

In some embodiments, the ROI (e.g., the heart) of the subject appears to move during the imaging process, the consistency and integrity of the target projection data may be destroyed, thereby causing motion artifacts in the target image. In addition, a target region (e.g., the coronary artery) of the ROI may include different portions with different motion amplitudes, which affecting the motion artifacts at different levels. In such cases, by using the multi-scale registration, each of the one or more neighboring images may be registered with the target image using at least two scales (e.g., from a relatively high scale to a relatively low scale), which can reflect actual motion information of the target region, thereby determining at least one motion vector between the target image phase and each of the one or more neighboring images phases more accurately. Accordingly, the motion correction for the target image based on the multi-scale registration may have a better effect than traditional motion correction technique such as based on a rigid registration, e.g., a registration (e.g., an affine transformation) using a transformation matrix.

It should be noted that the above description regarding the process 1000 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. In some embodiments, one or more operations may be omitted and/or one or more additional operations may be added. For example, the process 1000 may further include an operation for causing the secondary image to be displayed. As another example, the process 1000 may further include an operation for storing information and/or data relating to the motion correction.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, all aspects of the present disclosure may be performed entirely by hardware, may be performed entirely by softwares (including firmware, resident softwares, microcode, etc.), or may be performed by a combination of hardware and softwares. The above hardware or software can be referred to as "data block," "module," "engine," "unit," "component" or "system". In addition, aspects of the present disclosure may appear as a computer product located in one or more computer-readable media, the product including computer-readable program code.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PUP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. It should be noted that if the description, definition, and/or terms used in the appended application of the present disclosure is inconsistent or conflicting with the content described in the present disclosure, the use of the description, definition and/or terms of the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method implemented on a computing device having a processor and a computer-readable storage device, the method comprising:
obtaining multiple preliminary images of a subject, each of the multiple preliminary images corresponding to one of multiple phases of at least one motion cycle of the subject;

determining an image representation of a target region of the subject in each of the multiple preliminary images of the subject;

determining position variation or at least one motion trajectory of the target region based on image representations of the target region in at least a portion of the multiple preliminary images;

identifying a target phase of the subject among the multiple phases of the at least one motion cycle based on the position variation or the at least one motion trajectory, wherein the target phase and one or more neighboring phases of the target phase correspond to a target motion status of the target region; and generating a secondary image of the subject corresponding to the target motion status by correcting a target image corresponding to the target phase, wherein the target image refers to a preliminary image corresponding to the target phase.

2. The method of claim 1, wherein the multiple preliminary images are reconstructed based on original scanning data of the subject, the original scanning data corresponding to the multiple phases, and the original scanning data including original projection data, original magnetic resonance (MR) data or original positron emission tomography (PET) data.

3. The method of claim 1, wherein the determining an image representation of a target region of the subject in each of the multiple preliminary images of the subject includes:

for each of the multiple preliminary images of the subject, segmenting the target region of the subject in the preliminary image;

determining at least one feature element of the target region in the preliminary image; and determining the image representation of the target region in the preliminary image based on the at least one feature element of the target region.

4. The method of claim 3, wherein the image representation of the target region includes coordinate information of the at least one feature element of the target region.

5. The method of claim 1, wherein the identifying a target phase of the subject among the multiple phases of the at least one motion cycle based on the at least one motion trajectory includes:

obtaining image representations of the target region in preliminary images corresponding to a first plurality of consecutive phases among the multiple phases;

determining whether the at least one motion trajectory of the target region conforms to the target motion status based on a motion evaluation model; and in response to determining that the at least one motion trajectory of the target region conforms to the target motion status, designating a midpoint phase of the first plurality of consecutive phases as the target phase, wherein the at least one motion trajectory of the target region is determined based on the image representations of the target region in the preliminary images corresponding to the first plurality of consecutive phases.

6. The method of claim 5, wherein the motion evaluation model includes a neural network model.

7. The method of claim 5, further including:

in response to determining that one or more of the at least one motion trajectory of the target region do not conform to the target motion status, obtaining image representations of the target region in preliminary images corresponding to a second plurality of consecutive phases among the plurality of phases; and identifying the target phase of the subject based on the image representations of the target region in the preliminary images corresponding to the second plurality of consecutive phases.

8. The method of claim 1, wherein the target motion status includes a steady motion of the target region, and the steady motion of the target region refers to a motion status in which a motion velocity of the target region of the subject over a plurality of consecutive phases is a constant.

9. The method of claim 1, wherein the generating a secondary image of the subject corresponding to the target motion status by correcting a target image corresponding to the target phase includes:

obtaining the target image corresponding to the target phase and preliminary images corresponding to the one or more neighboring phases of the target phase; and generating the secondary image of the subject corresponding to the target motion status based on the target image corresponding to the target phase and the preliminary images corresponding to the one or more neighboring phases of the target phase.

10. The method of claim 9, wherein the generating the secondary image of the subject corresponding to the target motion status based on the target image corresponding to the target phase and the preliminary images corresponding to the one or more neighboring phases of the target phase includes:

determining at least one motion vector between the target phase and each of the one or more neighboring phases by performing a multi-scale registration between the target image corresponding to the target phase and each of the preliminary images corresponding to the one or more neighboring phases, wherein the multi-scale registration comprising:

registering the target image corresponding to the target phase and each of the preliminary images corresponding to the one or more neighboring phases using a first scale and a second scale, wherein the second scale is finer than the first scale; and generating the secondary image of the subject corresponding to the target motion status by correcting the target image corresponding to the target phase according to the at least one motion vector.

11. The method of claim 10, wherein the performing a multi-scale registration between the target image corresponding to the target phase and each of the preliminary images corresponding to the one or more neighboring phases includes:

segmenting the target region of the subject in the target image;

dividing the target region into two or more sub-regions;

obtaining a motion trend of each of the two or more sub-regions;

determining a sub-region scale for each of the two or more sub-regions based on the motion trend of each of the two or more sub-regions; and performing the multi-scale registration between each of the neighboring images and the target image based on the sub-region scale for each of the two or more sub-regions.

12. The method of claim 10, wherein the generating the secondary image of the subject corresponding to the target motion status by correcting the target image corresponding to the target phase according to the at least one motion vector includes:

dividing original scanning data of the target image into multiple groups of divided scanning data;

reconstructing multiple sub-images, each of the multiple sub-images is reconstructed based on one of the multiple groups of divided scanning data;

generating corrected sub-images by correcting the multiple sub-images according to the at least one motion vector; and generating the secondary image by fusing the corrected sub-images.

13. The method of claim 12, wherein each of the multiple sub-images includes a plurality of intermediate sub-phasic images each of which corresponds to a time point relating to the target phase, and the generating corrected sub-images by correcting the multiple sub-images according to the at least one motion vector includes:

for each of the plurality of intermediate sub-phasic images of each of the multiple sub-images, obtaining a phase midpoint of the sub-image;

obtaining a time point corresponding to the intermediate sub-phasic image;

obtaining, from the one or more neighboring phases and based on the phase midpoint and the time point, at least one neighboring phase corresponding to the intermediate sub-phasic images;

determining one or more motion vectors for the intermediate sub-phasic image based on the at least one neighboring phase; and generating a corrected intermediate sub-phasic image by correcting the intermediate sub-phasic image according to the one or more motion vectors; and generating a corrected sub-image by fusing a plurality of corrected intermediate sub-phasic images corresponding to the plurality of intermediate sub-phasic images of the sub-image.

14. The method of claim 1, wherein the position variation of the target region is represented by a variation of coordinate information of at least one feature element of the target region.

15. A system, comprising:

at least one storage device including a set of instructions; and at least one processor configured to communicate with the at least one storage device, wherein when executing the set of instructions, the at least one processor is configured to direct the system to perform operations including:

obtaining multiple preliminary images of a subject, each of the multiple preliminary images corresponding to one of multiple phases of at least one motion cycle of the subject;

determining an image representation of a coronary artery of the subject in each of the multiple preliminary images of the subject, wherein the subject is a heart of a patient;

identifying a target phase of the subject among the multiple phases of the at least one motion cycle based on the image representation of the coronary artery in each of the multiple preliminary images, wherein the target phase and one or more neighboring phases of the target phase correspond to a target motion status of the coronary artery; and generating a secondary image of the subject corresponding to the target motion status by correcting a target image corresponding to the target phase, wherein the target image refers to a preliminary image corresponding to the target phase.

16. The system of claim 15, wherein the determining an image representation of a coronary artery of the subject in each of the multiple preliminary images of the subject includes:

for each of the multiple preliminary images of the subject, segmenting the coronary artery of the subject in the preliminary image;

determining at least one feature element of the coronary artery in the preliminary image, wherein the at least one feature element includes a centerline of the coronary artery; and determining the image representation of the coronary artery in the preliminary image based on the at least one feature element of the coronary artery.

17. The system of claim 16, wherein the identifying a target phase of the subject among the multiple phases of the at least one motion cycle based on the image representation of the coronary artery in each of the multiple preliminary images includes:

obtaining image representations of the coronary artery in preliminary images corresponding to a first plurality of consecutive phases among the multiple phases;

determining position variation or at least one motion trajectory of the coronary artery based on the image representations of the coronary artery in the preliminary images corresponding to the first plurality of consecutive phases, wherein the position variation or the at least one motion trajectory of the coronary artery refers to a position variation or a motion trajectory of a point on the centerline of the coronary artery; and identifying a target phase of the subject among the multiple phases of the at least one motion cycle based on the position variation or the at least one motion trajectory of the coronary artery.

18. The system of claim 17, wherein the identifying a target phase of the subject among the multiple phases of the at least one motion cycle based on the position variation or the at least one motion trajectory of the coronary artery includes:

determining whether the at least one motion trajectory of the coronary artery conforms to the target motion status based on a motion evaluation model; and in response to determining that the at least one motion trajectory of the coronary artery conforms to the target motion status, designating a midpoint phase of the first plurality of consecutive phases as the target phase.

19. The system of claim 18, wherein the motion evaluation model includes a neural network model.

20. The system of claim 18, the operations further including:

in response to determining that one or more of the at least one motion trajectory of the coronary artery does not conform to the target motion status, obtaining image representations of the coronary artery in preliminary images corresponding to a second plurality of consecutive phases among the plurality of phases; and identifying the target phase of the subject based on the image representations of the coronary artery in the preliminary images corresponding to the second plurality of consecutive phases.

* * * * *